US011190232B2

(12) United States Patent
Kakinada et al.

(10) Patent No.: US 11,190,232 B2
(45) Date of Patent: Nov. 30, 2021

(54) METHODS AND APPARATUS FOR COORDINATED UTILIZATION OF QUASI-LICENSED WIRELESS SPECTRUM

(71) Applicant: Charter Communications Operating, LLC, St. Louis, MO (US)

(72) Inventors: Umamaheswar Kakinada, Carpentersville, IL (US); Don Gunasekara, Reston, VA (US); Ahmed Bencheikh, Lorton, VA (US); Shane Newberg, Aurora, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 16/459,364

(22) Filed: Jul. 1, 2019

(65) Prior Publication Data
US 2019/0393926 A1  Dec. 26, 2019

Related U.S. Application Data

(63) Continuation of application No. 15/785,283, filed on Oct. 16, 2017, now Pat. No. 10,340,976.

(51) Int. Cl.
*H04W 16/14* (2009.01)
*H04B 1/7136* (2011.01)
(Continued)

(52) U.S. Cl.
CPC ......... *H04B 1/7136* (2013.01); *H04B 1/7176* (2013.01); *H04W 16/14* (2013.01);
(Continued)

(58) Field of Classification Search
CPC ............... H04B 1/7136; H04B 1/7176; H04B 2001/71362; H04B 2001/7154; H04W 76/15

See application file for complete search history.

(56) References Cited

U.S. PATENT DOCUMENTS 5,991,308 A   11/1999   Fuhrmann et al.
5,995,499 A   11/1999   Hottinen et al.
(Continued)

FOREIGN PATENT DOCUMENTS

WO   WO-2017130494 A1   8/2017

OTHER PUBLICATIONS

Deering et al., Internet Protocol, Version 6 (IPv6) Specification, Dec. 1998, 39 pages.
(Continued)

*Primary Examiner* — Dac V Ha
(74) *Attorney, Agent, or Firm* — Gazdzinski & Associates, PC

(57) ABSTRACT

Methods and apparatus for providing quasi-licensed spectrum access within a prescribed area or venue, including to users or subscribers of one or more Mobile Network Operators (MNOs). In one embodiment, the quasi-licensed spectrum utilizes 3.5 GHz CBRS (Citizens Broadband Radio Service) spectrum allocated by a Federal or commercial SAS (Spectrum Access System) to a managed content delivery network that includes one or more wireless access nodes (e.g., CBSDs) in data communication with a controller, and the core(s) of the MNO network(s). In one variant, the controller dynamically allocates (i) spectrum within the area or venue within CBRS bands, and (ii) MNO "roaming" users or subscribers to CBRS bands (e.g., via extant LTE-TD technology). In one particular implementation, the managed network comprises a Multiple Systems Operator (MSO) network such as a cable or satellite network, and the MSO and MNO coordinate to implement user-specific and/or data-specific policies for the roaming MNO subscribers.

21 Claims, 17 Drawing Sheets

(51) Int. Cl.
*H04B 1/7176* (2011.01)
*H04W 76/15* (2018.01)
*H04B 1/715* (2011.01)

(52) U.S. Cl.
CPC ..... *H04W 76/15* (2018.02); *H04B 2001/7154* (2013.01); *H04B 2001/71362* (2013.01)

(56) References Cited

U.S. PATENT DOCUMENTS

| | | | |
|---|---|---|---|
| 6,154,648 A | 11/2000 | Comer | |
| 6,356,560 B1 | 3/2002 | Venters et al. | |
| 6,771,953 B1 | 8/2004 | Chow | |
| 8,189,465 B1 | 5/2012 | Pawar et al. | |
| 8,997,136 B2 | 3/2015 | Brooks et al. | |
| 9,166,891 B2 | 10/2015 | Hu et al. | |
| 9,258,809 B2 | 2/2016 | Liao et al. | |
| 9,386,496 B2 | 7/2016 | Gupta et al. | |
| 9,413,651 B2 | 8/2016 | Tsym et al. | |
| 9,526,056 B2 * | 12/2016 | Tomici | H04W 36/04 |
| 9,564,932 B1 | 2/2017 | Pack et al. | |
| 9,591,491 B2 | 3/2017 | Tapia et al. | |
| 9,612,816 B2 | 4/2017 | Choi et al. | |
| 9,654,149 B2 | 5/2017 | Piipponen et al. | |
| 9,699,663 B1 | 7/2017 | Jovancevic | |
| 9,730,135 B1 | 8/2017 | Rahman | |
| 9,730,143 B2 | 8/2017 | Gormley et al. | |
| 9,769,692 B2 | 9/2017 | Freda et al. | |
| 9,807,778 B2 | 10/2017 | Ma et al. | |
| 9,813,148 B2 | 11/2017 | Syed et al. | |
| 9,887,864 B1 | 2/2018 | Han et al. | |
| 10,098,568 B2 | 10/2018 | Gazdzinski | |
| 10,135,730 B2 | 11/2018 | Chou | |
| 10,484,876 B2 | 11/2019 | Shah et al. | |
| 10,506,456 B2 | 12/2019 | Lou et al. | |
| 10,680,883 B2 | 6/2020 | Hall et al. | |
| 10,805,562 B2 * | 10/2020 | Nakamura | H04N 5/3696 |
| 2002/0126748 A1 | 9/2002 | Rafie et al. | |
| 2004/0001021 A1 | 1/2004 | Choo et al. | |
| 2006/0188004 A1 | 8/2006 | Kizu et al. | |
| 2008/0097913 A1 | 4/2008 | Dicks et al. | |
| 2008/0220788 A1 * | 9/2008 | Stanwood | H04L 5/0007 455/450 |
| 2009/0034443 A1 | 2/2009 | Walker et al. | |
| 2009/0129273 A1 | 5/2009 | Zou | |
| 2010/0094956 A1 | 4/2010 | Zuckerman et al. | |
| 2010/0309806 A1 | 12/2010 | Wu et al. | |
| 2011/0014924 A1 | 1/2011 | Hwang et al. | |
| 2013/0122903 A1 | 5/2013 | Farnsworth et al. | |
| 2013/0281092 A1 | 10/2013 | Gassend | |
| 2013/0288675 A1 | 10/2013 | Gassend | |
| 2013/0315124 A1 | 11/2013 | Rapaport et al. | |
| 2013/0336175 A1 * | 12/2013 | Um | H04L 5/14 370/280 |
| 2014/0106672 A1 | 4/2014 | Jeon et al. | |
| 2014/0194068 A1 | 7/2014 | Coppage et al. | |
| 2014/0269526 A1 * | 9/2014 | Mitola, III | H04L 5/0037 370/329 |
| 2014/0308986 A1 | 10/2014 | Yang et al. | |
| 2015/0055623 A1 | 2/2015 | Li et al. | |
| 2015/0071239 A1 | 3/2015 | Zhang et al. | |
| 2015/0208262 A1 | 7/2015 | Siomina | |
| 2015/0280847 A1 | 10/2015 | Somasundaram et al. | |
| 2016/0007147 A1 * | 1/2016 | Zhang | H04W 64/006 455/456.1 |
| 2016/0073259 A1 | 3/2016 | Lee et al. | |
| 2016/0127185 A1 | 5/2016 | McAllister et al. | |
| 2016/0165066 A1 | 6/2016 | Yang et al. | |
| 2016/0212031 A1 | 7/2016 | Jain et al. | |
| 2016/0234746 A1 | 8/2016 | Gopal et al. | |
| 2016/0330743 A1 | 11/2016 | Das | |
| 2016/0381600 A1 * | 12/2016 | Aksu | H04W 16/14 455/453 |
| 2017/0026203 A1 | 1/2017 | Thomas et al. | |
| 2017/0155703 A1 | 6/2017 | Hao et al. | |
| 2017/0164326 A1 | 6/2017 | Worrall | |
| 2017/0188241 A1 | 6/2017 | Mueck et al. | |
| 2017/0208540 A1 | 7/2017 | Egner et al. | |
| 2017/0237767 A1 | 8/2017 | George et al. | |
| 2017/0257750 A1 | 9/2017 | Gunasekara et al. | |
| 2017/0295578 A1 | 10/2017 | Khoshnevisan et al. | |
| 2017/0303138 A1 * | 10/2017 | Barmettler | H04W 72/0453 |
| 2017/0318472 A1 | 11/2017 | Yu et al. | |
| 2017/0359731 A1 | 12/2017 | Soldati et al. | |
| 2018/0007587 A1 | 1/2018 | Feldman et al. | |
| 2018/0063736 A1 | 3/2018 | Sadeghi et al. | |
| 2018/0063758 A1 | 3/2018 | Velu | |
| 2018/0115903 A1 * | 4/2018 | Badic | H04W 16/14 |
| 2018/0124613 A1 * | 5/2018 | Kang | H04B 1/713 |
| 2018/0132112 A1 | 5/2018 | Khoshnevisan et al. | |
| 2018/0146058 A1 | 5/2018 | Somayazulu et al. | |
| 2018/0146408 A1 | 5/2018 | Meylan et al. | |
| 2018/0167948 A1 * | 6/2018 | Egner | H04W 72/082 |
| 2018/0199214 A1 | 7/2018 | Shen | |
| 2018/0234403 A1 | 8/2018 | Casella et al. | |
| 2018/0235007 A1 | 8/2018 | Gou et al. | |
| 2018/0242184 A1 * | 8/2018 | Yerramalli | H04W 16/18 |
| 2018/0255576 A1 | 9/2018 | Bhorkar et al. | |
| 2018/0279212 A1 | 9/2018 | Malik et al. | |
| 2018/0316563 A1 | 11/2018 | Kumar et al. | |
| 2018/0352386 A1 | 12/2018 | Gunasekara et al. | |
| 2019/0021012 A1 | 1/2019 | Beck et al. | |
| 2019/0028182 A1 | 1/2019 | Smyth et al. | |
| 2019/0081690 A1 | 3/2019 | Mueck et al. | |
| 2019/0082447 A1 | 3/2019 | Harsha et al. | |
| 2019/0098510 A1 | 3/2019 | Guo et al. | |
| 2019/0098632 A1 * | 3/2019 | Martin | H04W 16/14 |
| 2019/0104551 A1 | 4/2019 | Deenoo et al. | |
| 2019/0115950 A1 | 4/2019 | Kakinada et al. | |
| 2019/0150182 A1 | 5/2019 | Koorapaty et al. | |
| 2019/0182895 A1 | 6/2019 | Di Girolamo et al. | |
| 2019/0230613 A1 | 7/2019 | Kim et al. | |
| 2019/0239190 A1 | 8/2019 | Patel et al. | |
| 2019/0319814 A1 | 10/2019 | Das | |
| 2019/0320490 A1 | 10/2019 | Liu et al. | |
| 2019/0349848 A1 | 11/2019 | Bali | |
| 2019/0364565 A1 | 11/2019 | Hmimy | |
| 2019/0373615 A1 | 12/2019 | Cimpu et al. | |
| 2019/0394790 A1 | 12/2019 | Damnjanovic et al. | |
| 2020/0021689 A1 | 1/2020 | Sultana et al. | |
| 2020/0025629 A1 | 1/2020 | Zinger | |
| 2020/0053545 A1 | 2/2020 | Wong et al. | |
| 2020/0083892 A1 | 3/2020 | Kundu et al. | |
| 2020/0084759 A1 | 3/2020 | Liu | |
| 2020/0187150 A1 | 6/2020 | Eisner | |
| 2020/0344515 A1 | 10/2020 | Wong et al. | |
| 2021/0051653 A1 | 2/2021 | Park et al. | |
| 2021/0127423 A1 | 4/2021 | Park et al. | |
| 2021/0204322 A1 | 7/2021 | Lou et al. | |

OTHER PUBLICATIONS

Internet Protocol DARPA Internet Program Protocol Specification, Sep. 1981, 51 pages.
Signaling Protocols and Procedures for Citizens Broadband Radio Service (CBRS): Spectrum Access System, (SAS)—Citizens Broadband Radio Service Device (CBSD) Interface Technical Specification—Document WINNF-TS-0016, Version V1.2.1, Jan. 3, 2018.
Souryal, Michael R., et al., "Effect of Federal Incumbent Activity on CBRS Commercial Service", International Symposium on Dynamic Spectrum Access Networks (DySPAN), IEEE 2019, 5 pages.

* cited by examiner

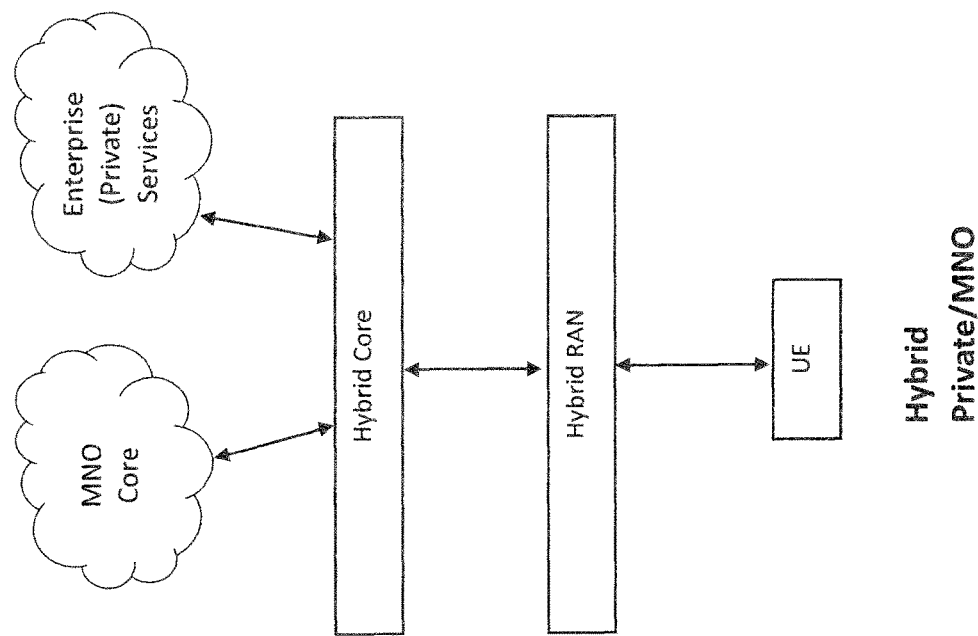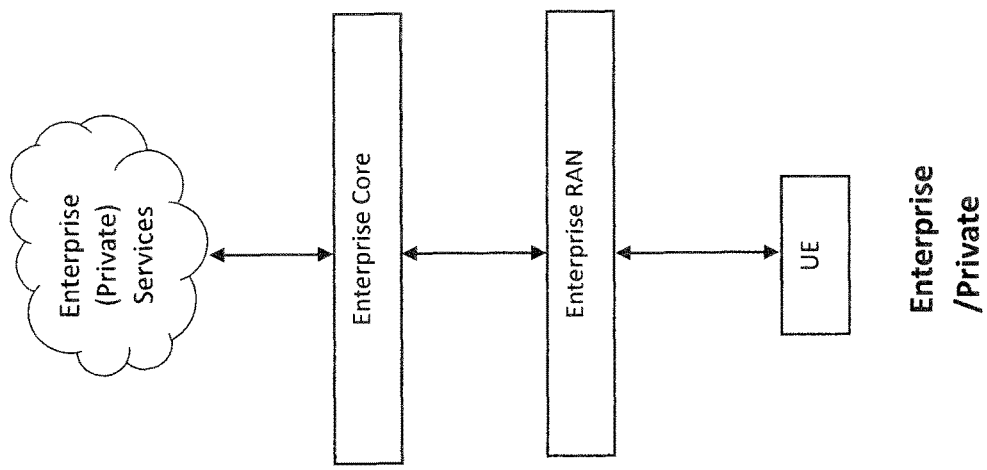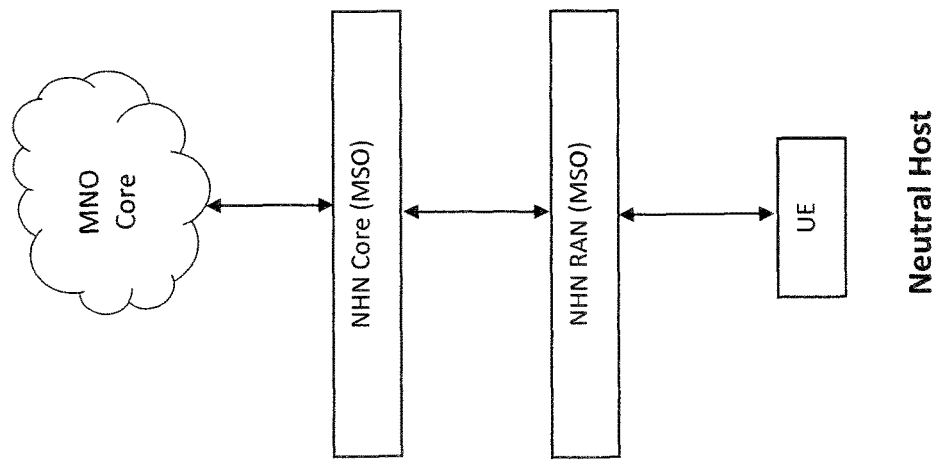
FIG. 4a-1

METHODS AND APPARATUS FOR COORDINATED UTILIZATION OF QUASI-LICENSED WIRELESS SPECTRUM

PRIORITY AND RELATED APPLICATIONS

This application is a continuation of and claims priority to co-owned U.S. patent application Ser. No. 15/785,283 filed on Oct. 16, 2017, issuing as U.S. Pat. No. 10,340,976 on Jul. 2, 2019, and entitled "Methods and Apparatus for Coordinated Utilization of Quasi-Licensed Wireless Spectrum," which is incorporated herein by reference in its entirety.

Additionally, this application is generally related to the subject matter of co-owned and copending U.S. patent application Ser. No. 15/677,940 filed Aug. 15, 2017 and entitled "METHODS AND APPARATUS FOR DYNAMIC CONTROL AND UTILIZATION OF QUASI-LICENSED WIRELESS SPECTRUM", incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates generally to the field of wireless networks and specifically, in one or more exemplary embodiments, to methods and apparatus for dynamically controlling and optimizing utilization of quasi-licensed radio frequency spectrum, such as for example those providing connectivity via Citizens Broadband Radio Service (CBRS) technologies.

2. Description of Related Technology

A multitude of wireless networking technologies, also known as Radio Access Technologies ("RATs"), provide the underlying means of connection for radio-based communication networks to user devices. Such RATs often utilize licensed radio frequency spectrum (i.e., that allocated by the FCC per the Table of Frequency Allocations as codified at Section 2.106 of the Commission's Rules. In the United States, regulatory responsibility for the radio spectrum is divided between the U.S. Federal Communications Commission (FCC) and the National Telecommunications and Information Administration (NTIA). The FCC, which is an independent regulatory agency, administers spectrum for non-Federal use (i.e., state, local government, commercial, private internal business, and personal use) and the NTIA, which is an operating unit of the Department of Commerce, administers spectrum for Federal use (e.g., use by the Army, the FAA, and the FBI). Currently only frequency bands between 9 kHz and 275 GHz have been allocated (i.e., designated for use by one or more terrestrial or space radio communication services or the radio astronomy service under specified conditions). For example, a typical cellular service provider might utilize spectrum for so-called "3G" (third generation) and "4G" (fourth generation) wireless communications as shown in Table 1 below:

TABLE 1

| Technology | Bands |
| --- | --- |
| 3G | 850 MHz Cellular, Band 5 (GSM/GPRS/EDGE). |
|  | 1900 MHz PCS, Band 2 (GSM/GPRS/EDGE). |
|  | 850 MHz Cellular, Band 5 (UMTS/HSPA+ up to 21 Mbit/s). |
|  | 1900 MHz PCS, Band 2 (UMTS/HSPA+ up to 21 Mbit/s). |
| 4G | 700 MHz Lower B/C, Band 12/17 (LTE). |
|  | 850 MHz Cellular, Band 5 (LTE). |
|  | 1700/2100 MHz AWS, Band 4 (LTE). |
|  | 1900 MHz PCS, Band 2 (LTE). |
|  | 2300 MHz WCS, Band 30 (LTE). |

Alternatively, unlicensed spectrum may be utilized, such as that within the so-called ISM-bands. The ISM bands are defined by the ITU Radio Regulations (Article 5) in footnotes 5.138, 5.150, and 5.280 of the Radio Regulations. In the United States, uses of the ISM bands are governed by Part 18 of the Federal Communications Commission (FCC) rules, while Part 15 contains the rules for unlicensed communication devices, even those that share ISM frequencies. Table 2 below shows typical ISM frequency allocations:

TABLE 2

| Frequency range | Type | Center frequency | Availability | Licensed users |
| --- | --- | --- | --- | --- |
| 6.765 MHz-6.795 MHz | A | 6.78 MHz | Subject to local acceptance | Fixed service & mobile service |
| 13.553 MHz-13.567 MHz | B | 13.56 MHz | Worldwide | Fixed & mobile services except aeronautical mobile (R) service |
| 26.957 MHz-27.283 MHz | B | 27.12 MHz | Worldwide | Fixed & mobile service except aeronautical mobile service, CB radio |
| 40.66 MHz-40.7 MHz | B | 40.68 MHz | Worldwide | Fixed, mobile services & earth exploration-satellite service |
| 433.05 MHz-434.79 MHz | A | 433.92 MHz | only in Region 1, subject to local acceptance | amateur service & radiolocation service, additional apply the provisions of footnote 5.280 |
| 902 MHz-928 MHz | B | 915 MHz | Region 2 only (with some exceptions) | Fixed, mobile except aeronautical mobile & radiolocation service; in Region 2 additional amateur service |
| 2.4 GHz-2.5 GHz | B | 2.45 GHz | Worldwide | Fixed, mobile, radiolocation, amateur & amateur-satellite service |
| 5.725 GHz-5.875 GHz | B | 5.8 GHz | Worldwide | Fixed-satellite, radiolocation, mobile, amateur & amateur-satellite service |
| 24 GHz-24.25 GHz | B | 24.125 GHz | Worldwide | Amateur, amateur-satellite, radiolocation & earth exploration-satellite service (active) |

TABLE 2-continued

| Frequency range | Type | Center frequency | Availability | Licensed users |
|---|---|---|---|---|
| 61 GHz-61.5 GHz | A | 61.25 GHz | Subject to local acceptance | Fixed, inter-satellite, mobile & radiolocation service |
| 122 GHz-123 GHz | A | 122.5 GHz | Subject to local acceptance | Earth exploration-satellite (passive), fixed, inter-satellite, mobile, space research (passive) & amateur service |
| 244 GHz-246 GHz | A | 245 GHz | Subject to local acceptance | Radiolocation, radio astronomy, amateur & amateur-satellite service |

ISM bands are also been shared with (non-ISM) license-free communications applications such as wireless sensor networks in the 915 MHz and 2.450 GHz bands, as well as wireless LANs and cordless phones in the 915 MHz, 2.450 GHz, and 5.800 GHz bands.

Additionally, the 5 GHz band has been allocated for use by, e.g., WLAN equipment, as shown in Table 3:

TABLE 3

| Band Name | Frequency Band | Dynamic Freq. Selection Required (DFS)? |
|---|---|---|
| UNII-1 | 5.15 to 5.25 GHz | No |
| UNII-2 | 5.25 to 5.35 GHz | Yes |
| UNII-2 Extended | 5.47 to 5.725 GHz | Yes |
| UNII-3 | 5.725 to 5.825 GHz | No |

User client devices (e.g., smartphone, tablet, phablet, laptop, smartwatch, or other wireless-enabled devices, mobile or otherwise) generally support multiple RATs that enable the devices to connect to one another, or to networks (e.g., the Internet, intranets, or extranets), often including RATs associated with both licensed and unlicensed spectrum. In particular, wireless access to other networks by client devices is made possible by wireless technologies that utilize networked hardware, such as a wireless access point ("WAP" or "AP"), small cells, femtocells, or cellular towers, serviced by a backend or backhaul portion of service provider network (e.g., a cable network). A user may generally access the network at a "hotspot," a physical location at which the user may obtain access by connecting to modems, routers, APs, etc. that are within wireless range.

CBRS—

In 2016, the FCC made available Citizens Broadband Radio Service (CBRS) spectrum in the 3550-3700 MHz (3.5 GHz) band, making 150 MHz of spectrum available for mobile broadband and other commercial users. The CBRS is unique, in that it makes available a comparatively large amount of spectrum (frequency bandwidth) without the need for expensive auctions, and without ties to a particular operator or service provider.

Moreover, the CBRS spectrum is suitable for shared use between government and commercial interests, based on a system of existing "incumbents," including the Department of Defense (DoD) and fixed satellite services. Specifically, a three-tiered access framework for the 3.5 GHz is used; i.e., (i) an Incumbent Access tier 102, (ii) Priority Access tier 104, and (iii) General Authorized Access tier 106. See FIG. 1. The three tiers are coordinated through one or more dynamic Federal Spectrum Access Systems (FSAS) 202 as shown in FIG. 2.

Incumbent Access (existing DOD and satellite) users 102 include authorized federal and grandfathered Fixed Satellite Service (FSS) users currently operating in the 3.5 GHz band shown in FIG. 1. These users will be protected from harmful interference from Priority Access License (PAL) and General Authorized Access (GAA) users. The sensor networks, operated by Environmental Sensing Capability (ESC) operators, make sure that incumbents and others utilizing the spectrum are protected from interference.

The Priority Access tier 104 (including acquisition of spectrum for up to three years through an auction process) consists of Priority Access Licenses (PALs) that will be assigned using competitive bidding within the 3550-3650 MHz portion of the band. Each PAL is defined as a non-renewable authorization to use a 10 MHz channel in a single census tract for three years. Up to seven (7) total PALs may be assigned in any given census tract, with up to four PALs going to any single applicant. Applicants may acquire up to two-consecutive PAL terms in any given license area during the first auction.

The General Authorized Access tier 106 (for any user with an authorized 3.5 GHz device) is licensed-by-rule to permit open, flexible access to the band for the widest possible group of potential users. General Authorized Access users are permitted to use any portion of the 3550-3700 MHz band not assigned to a higher tier user and may also operate opportunistically on unused Priority Access channels. See FIG. 2a.

The FCC's three-tiered spectrum sharing architecture of FIG. 1 utilizes "fast-track" band (3550-3700 MHz) identified by PCAST and NTIA, while Tier 2 and 3 are regulated under a new Citizens Broadband Radio Service (CBRS). CBSDs (Citizens Broadband radio Service Devices—in effect, wireless access points) 206 (FIG. 2) can only operate under authority of a centralized Spectrum Access System (SAS) 202. Rules are optimized for small-cell use, but also accommodate point-to-point and point-to-multipoint, especially in rural areas.

Under the FCC system, the standard FSAS 202 includes the following elements: (1) CBSD registration; (2) interference analysis; (3) incumbent protection; (4) PAL license validation; (5) CBSD channel assignment; (6) CBSD power limits; (7) PAL protection; and (8) FSAS-to-FSAS coordination. As shown in FIG. 2, these functions are provided for by, inter alia, an incumbent detection (i.e., environmental sensing) function 207 configured to detect use by incumbents, and an incumbent information function 209 configured to inform the incumbent when use by another user occurs. An FCC database 211 is also provided, such as for PAL license validation, CBSD registration, and other functions.

An optional Domain Proxy (DP) 208 is also provided for in the FCC architecture. Each DP 208 includes: (1) SAS interface GW including security; (2) directive translation between CBSD 206 and domain commands; (3) bulk CBSD directive processing; and (4) interference contribution reporting to the FSAS.

A domain is defined as any collection of CBSDs 206 that need to be grouped for management; e.g.: large enterprises, venues, stadiums, train stations. Domains can be even larger/broader in scope, such as for example a terrestrial operator network. Moreover, domains may or may not use private addressing. A Domain Proxy (DP) 208 can aggregate control information flows to Commercial SAS (CSAS), not shown, and generate performance reports, channel requests, heartbeats, etc.

CBSDs 206 can generally be categorized as either Category A or Category B. Category A CBSDs have an EIRP or Equivalent Isotropic Radiated Power of 30 dBm (1 Watt)/10 MHz, fixed indoor or outdoor location (with an antenna <6 m in length if outdoor). Category B CBSDs have 47 dBm EIRP (50 Watts)/10 MHz, and fixed outdoor location only. Professional installation of Category B CBSDs is required, and the antenna must be less than 6 m in length. All CBSD's have a vertical positioning accuracy requirement of +/−3 m. Terminals (i.e., user devices akin to UE) have 23 dBm EIRP (0.2 Watts)/10 MHz requirements, and mobility of the terminals is allowed.

In terms of spectral access, CBRS utilizes a time division duplex (TDD) multiple access architecture.

Unlicensed Spectrum Technologies—

Extant wireless technologies intended for use in the unlicensed spectrum (such as Wi-Fi and LTE-U and LTE-LAA) must coexist with other users in those bands, and hence necessarily employ contention management techniques to help optimize performance. For example, Wi-Fi utilizes a back-off mechanism for collision avoidance known as carrier-sense multiple access with collision avoidance ("CSMA/CA"). In particular, when a first network node or station receives a packet to be sent to another node or station, Wi-Fi (according to, e.g., the prevailing 802.11 standard under which the system operates) initiates physical carrier sensing and virtual carrier sensing mechanisms to determine whether the medium (e.g., a channel and/or frequency used by the Wi-Fi transceiver) is busy or occupied by other transmissions (physical and virtual carrier sensing). In addition to the conditions set by physical carrier sensing and virtual carrier sensing, the Wi-Fi CSMA/CA may impose further checks by a node to ensure that the channel on which the packet is to be sent is clear.

Likewise, LTE-U collision avoidance mechanisms (at least in theory) attempt to choose a free or idle channel (i.e., not in use) in which no other LTE-U node or Wi-Fi AP is operating; if a free channel is not found, the LTE-U node should apply duty cycle procedures that allow the node to share a channel with Wi-Fi and other LTE-U signals. In some circumstances, duty cycling parameters may be adapted to usage of other signals, e.g., in response to Wi-Fi usage.

However, even with such mechanisms, increasing numbers of users (whether users of wireless interfaces of the aforementioned standards, or others) invariably lead to "crowding" of the spectrum, including interference. Interference may also exist from non-user sources such as solar radiation, electrical equipment, military uses, etc. In effect, a given amount of spectrum has physical limitations on the amount of bandwidth it can provide, and as more users are added in parallel, each user potentially experiences more interference and degradation of performance. Simply stated, contention management has limits on the benefits it can provide.

Moreover, technologies such as Wi-Fi have limited range (due in part to the unlicensed spectral power mask imposed in those bands), and may suffer from spatial propagation variations (especially inside structures such as buildings) and deployment density issues. Wi-Fi has become so ubiquitous that, especially in high-density scenarios such as hospitality units (e.g., hotels), enterprises, crowded venues, and the like, the contention issues may be unmanageable, even with a plethora of Wi-Fi APs installed to compensate.

Yet further, there is generally no coordination between such APs, each in effect contending for bandwidth on its backhaul with others.

Additionally, lack of integration with other services provided by e.g., a managed network operator, typically exists with unlicensed technology such as Wi-Fi. Wi-Fi typically acts as a "data pipe" opaquely carried by the network operator/service provider.

Licensed Spectrum Operators—

A variety of different types of mobile network (e.g., cellular) operators exist, as described below:

1) Mobile Network Operator (MNO): The MNO is responsible for the creation, operation, and maintenance of the mobile network infrastructure. MNOs will typically purchase/lease their licensed spectrum from the regulatory body of the relevant territory, and also purchase/lease the network infrastructure and equipment from a plurality of equipment vendors and network integrators. Additionally, MNOs must select and obtain suitable handsets for their subscribers, which are compatible with the installed infrastructure for all intended uses (e.g., voice and data). The MNO also typically maintains its own Business and Operational Support System (BOSS), and are responsible for billing MNO subscribers, tracking data such as used minutes, roaming charges, etc.

2) Mobile Virtual Network Operator (MVNO): An MVNO typically utilizes the infrastructure maintained and provided by the MNO (e.g., "piggy-backs" on the existing MNO capabilities) to provide service to a different set of subscribers not served by the MNO. For example, an MNO may have unused capacity that it may be willing to lease or sell to the MVNO at a different rate than that associated with its (primary) subscribers. MVNOs will often have their own BOSS capability, including for billing its own customers; however, some MVNOs rely on the MNO support and BOSS capabilities to provide data, such as e.g., usage information for the MVNO customers, such that the MVNO can accurately bill them. In yet another model, the MNO BOSS capabilities may assume all billing responsibilities for the MVNO(s).

3) Mobile Virtual Network Aggregator (MVNA): To enhance economies of scale, an MVNA may be used to combine or aggregate two or more smaller MVNOs for obtaining service to the MNO. In this role, the MVNA acts as an interface between the individual smaller MVNOs and the MNO. Accordingly, an MVNA will typically not have its own direct subscribers, but rather only service the MVNOs that it represents/aggregates. It would typically also have its own BOSS to be able to generate and provide billing and related data for the individual constituent MVNOs.

Closely relates to the MVNA is the Mobile Virtual Network Enabler (MVNE), which in effect enables "outsourcing" of all functionality related to virtual mobile networks. The MVNE can typically provide services to such as billing, network element provisioning, operations, BOSS functions, etc. to small MVNOs, and does not have any end-user customers of its own. Rather, the MVNE provides a "back end" for the front-facing (i.e., subscriber-facing) MVNO(s).

Notably, under any of the foregoing models, MNO/MVNO subscribers are provided cellular service only by these networks/entities. Specifically, depending on the particular air interface technology selected (e.g., 3GPP/LTE/LTE-A, WCDMA, or GSM), the subscriber has two options for connection for voice or data services: (i) cellular based technology, or (ii) WLAN (e.g., Wi-Fi). LTE coverage in licensed spectrum cellular networks is widely available, but there is significant burden on data rates and throughput.

Specifically, while coverage over broad geographical areas may exist, MNO networks are becoming increasingly congested with many users and "data hungry" applications such as video streaming. Adding additional capacity in such MNO networks is hugely expensive, and average revenue per user (ARPU) on MNO networks is steadily declining over time.

Further, while both of these options may be available in some areas or venues, one or both may not be available in others, or may operate in less-than-optimal fashion. For example, WLAN coverage via unlicensed spectrum can be spotty and contentious (depending on the presence of interference, competing users, etc. as previously described), and cellular coverage, even when available, typically costs the user in one fashion or another (whether for minutes or GB of data used, roaming charges, or even increased batter consumption due to having to communicate with the potentially distance eNodeB or other cell site). Similarly, LTE data performance may vary as a function of the coverage area, such that user experience for e.g., the aforementioned data-hungry applications is not optimized over that interface.

Moreover, some of the benefits of cellular service are lost when transitioning to WLAN (where available), including benefits or priorities for service afforded by the subscriber's MNO as part of their plan. WLAN use is typically "take it as you find it," including any service or other limitations associated therewith.

Extant CBRS architectures, while promising from the standpoint of reduced contention for spectrum, currently lack such network-wide coordination and integration, as well as implementation details enabling optimization of user experience, especially for users of a multi-mode content distribution network such as that of a cable, satellite, or terrestrial service operator.

Moreover, such extant CBRS architectures do not account for integration with MNOs (e.g., cell service networks), such that the user experience when using and/or transition to/from CBRS (i.e., to/from licensed spectrum cell service) is seamless.

SUMMARY

The present disclosure addresses the foregoing needs by providing, inter alia, methods and apparatus for dynamically controlling access to and utilization of quasi-licensed spectrum (such as for example that of CBRS) in conjunction with one or more MNOs and users/subscribers thereof.

In one aspect, a method for providing wireless service within a first wireless network infrastructure to a mobile user device served by a second wireless network infrastructure is disclosed. In one embodiment, the method includes: at least temporarily registering the mobile user device with the first wireless network infrastructure; selecting at least one quasi-licensed band for use by the mobile user device within the first wireless network infrastructure; communicating data to the mobile user device enabling the mobile user device to access the selected at least one quasi-licensed band for use; and establishing communication with the mobile user device using the at least one quasi-licensed band via one or more access points of the first wireless network infrastructure.

In one variant, the communicating data includes transmitting the data to the mobile user device via a data interface between the first wireless network infrastructure and the second wireless network infrastructure.

In another variant, the method further includes communicating user data to and from the mobile user device via a data interface between the first wireless network infrastructure and the second wireless network infrastructure, the user data generated as part of a communication session established using the at least one quasi-licensed band and the one or more access points.

In yet another variant, the establishing communication with the mobile user device using the at least one quasi-licensed band via one or more access points of the first wireless network infrastructure includes using an Long Term Evolution—Time Division Duplex (LTE-TDD) protocol to establish communication within a Citizens Broadband Radio Service (CBRS) quasi-licensed band via at least one CBSD.

In a further variant, the establishing communication with the mobile user device using the at least one quasi-licensed band via one or more access points of the first wireless network infrastructure includes imposing at least one service policy associated with the second wireless network infrastructure as part of the communication. In one implementation thereof, the method further includes communicating user data to and from the mobile user device via a data interface between the first wireless network infrastructure and the second wireless network infrastructure, the user data generated as part of a communication session established using the at least one quasi-licensed band and the one or more access points. The imposition of at least one service policy associated with the second wireless network infrastructure as part of the communication includes imposing a QoS (quality of service policy) for at least a portion of the user data.

In still another variant, the method further includes communicating user data to and from the mobile user device via a data interface between the first wireless network infrastructure and the second wireless network infrastructure, the user data generated as part of a communication session established using the at least one quasi-licensed band and the one or more access points. In one implementation, the communicating the user data includes prioritizing the user data with respect to other user data transacted by the one or more access points.

In another variant, the method further includes, prior to the selecting at least one quasi-licensed band for use by the mobile user device within the first wireless network infrastructure: transmitting a spectrum request to a spectrum allocation authority; and receiving a spectrum grant from the allocation authority for at least a period of time, the spectrum grant including the at least one quasi-licensed band.

In a further variant, the at least temporarily registering the mobile user device with the first wireless network infrastructure includes obtaining data specific to the mobile user device form an authentication entity of the second network infrastructure.

In another aspect of the disclosure, a method for providing mobile visiting access services for at least one mobile client device is provided. In one embodiment, the device is configured to use first and second wireless protocols, and the method includes: registering, while the at least one mobile client device is utilizing the first wireless protocol, the at least one mobile client device with a temporary service provider network, the temporary service provider network comprising both a radio access network (RAN) and a core portion; allocating quasi-licensed spectrum to the at least one mobile client device for use within the RAN; and causing the at least one mobile client device to transition from the first wireless protocol to the second wireless protocol.

In one variant, the first wireless protocol includes a Long Term Evolution (LTE)-FDD (frequency division duplex)

cellular protocol, and the second protocol includes an LTE-TDD (time division duplex) protocol. The LTE-FDD protocol is configured to use a cellular (licensed) band, while the second protocol is configured to use a CBRS band between 3.550 and 3.700 GHz.

In a further variant, the allocating quasi-licensed spectrum includes: transmitting data to a domain proxy (DP), the DP configured to communicate at least a portion of the data to a Spectrum Access System (SAS) to obtain access to a Citizens Broadband Radio Service (CBRS) band; receiving from the DP data indicating a CBRS band allocation; and allocating at least a portion of the CBRS band allocation for use by at least one mobile client device in communicating with an access point of the RAN.

In another variant, the registering the at least one mobile client device with a temporary service provider network includes: receiving, from a cellular service provider network core portion, data indicative of the at least one mobile device; and utilizing the received data to authenticate the at least one mobile device within the temporary service provider network pursuant to a service request issued from the at least one mobile client device. In one implementation, the method also further includes establishing data communication between the at least one mobile user device and the cellular service provider network; and transacting one or more messages between a user device of the cellular service provider network and the at least one mobile user device via the cellular service provider network and the temporary service provider network.

The transacting one or more messages between a user device of the cellular service provider network and the at least one mobile user device via the cellular service provider network and the temporary service provider network includes in another implementation utilizing both a core portion of the cellular service provider network and a core portion of the temporary service provider network.

In a further variant, the registering the at least one mobile client device with a temporary service provider network includes: receiving, at the temporary service provider network, a service request issued from the at least one mobile client device, the service request comprising data identifying the at least one mobile client device; transmitting the comprising data identifying the at least one mobile client device to an authentication entity of a cellular service provider; and receiving data authenticating the at least one mobile client device.

In another aspect of the disclosure, a method is disclosed whereby one or more MNOs can use the MVNO/MSO core network to access Internet services, thereby reducing round-trip delay for obtaining such services for MNO subscribers, and improving the QoS provided.

In another aspect of the disclosure, network apparatus for use within a first network is disclosed. In one embodiment, the network apparatus is configured to at least temporarily provide wireless service within a quasi-licensed frequency band to subscribers of a second network, and includes: digital processor apparatus; network interface apparatus in data communication with the digital processor apparatus and configured to transact data with one or more computerized entities of the second network; and a storage apparatus in data communication with the digital processor apparatus and comprising at least one computer program.

In one variant, the at least one computer program is configured to, when executed on the digital processor apparatus: receive first data from the one or more computerized entities relating to a subscriber device operative within the second network; receive second data pursuant to a request for wireless service from the subscriber device; based at least on the received first and second data, authenticate the subscriber device; allocate quasi-licensed spectrum for use by at least the subscriber device; cause transmission of first data to the one or more computerized entities of the second network, the first data enabling the subscriber device to utilize the allocated quasi-licensed spectrum.

In one implementation, the at least one computer program is further configured to enable transaction of user data over at least a core portion of the first network and a core portion of the second network and via a data interface between the first and second networks. For example, the transaction of user data over at least a core portion of the first and second networks is configured to be conducted according to at least one user-specific or device-specific policy specified by the second network.

In one aspect of the disclosure, a method for providing wireless connectivity for at least one mobile client device is described. In one embodiment, the method includes . . . .

In another aspect, methods for roaming MNO user access to CBRS services via a managed content distribution network are disclosed. In one embodiment, the methods include evaluating user network access requests, identifying MNO roaming user request therefrom, and allocating available (e.g., SAS-allocated) resources within a quasi-licensed band at least temporarily for the MNO users within the MSO quasi-licensed coverage area, including data backhaul to the MNO core.

In an additional aspect of the disclosure, computer readable apparatus is described. In one embodiment, the apparatus includes a storage medium configured to store one or more computer programs. In one embodiment, the apparatus includes a program memory or HDD or SDD on a computerized controller device. In another embodiment, the apparatus includes a program memory, HDD or SSD on a computerized access node (e.g., CBSD). In yet another embodiment, the apparatus includes a program memory, HDD or SSD on a wireless-enabled mobile user device.

In a further aspect, a connection manager entity is disclosed. In one embodiment, the connection manager comprises a computer program operative to execute on a digital processor apparatus, and configured to, when executed, obtain data relating to a quality of service or strength of signal of each of (i) the MSO-provided CBRS service, and (ii) the MNO-provided cellular service, and cause selection of one over the other based on the comparison. In one implementation, the connection manager entity (e.g., program) is disposed on a user mobile device (e.g., UE), and configured to autonomously perform the aforementioned obtainment of data and comparison, such as at the then-current location of the UE. In another implementation, the connection manager entity is disposed on an MSO network controller entity (i.e., a CBRS system controller), and configured to evaluate the CBRS and MNO cellular options at one or more locations within a prescribed CBRS coverage area (e.g., via use of one or more base stations or eNBs).

In a further aspect of the present disclosure, business methods for enabling an alternative type of wireless connectivity to one or more user devices are provided. In one embodiment, the method(s) include enabling temporary or ad hoc CBRS connectivity for a MNO subscriber having a cellular LTE subscription with the MNO, the MNO and the operator of the CBRS network having a prescribed business relationship.

In another implementation, the inter-cell handovers are conducted in order to maintain QoS (quality of service) requirements for users applications (or QoS policy invoked by the network operator or the roaming MNO user's MNO policies), and to minimize the disruption to the relevant MNO operator network cores.

In another aspect, a method of supplementing MNO licensed network coverage using quasi-licensed spectrum of an MSO is disclosed. In one embodiment, the method includes operating a user device consistent with a first air interface protocol using licensed spectrum; determining a need or desire to use the quasi-licensed spectrum; and based at least on the determining, causing the user device to transition to a second air interface protocol for communication via the quasi-licensed spectrum. User voice and/or data service is then established via the second air interface between a CBSD and the user device, as well as at least portions of the MSO and MNO cores.

These and other aspects shall become apparent when considered in light of the disclosure provided herein.

BRIEF DESCRIPTION OF THE DRAWINGS

FIG. 4a-1 is a graphical representation of typical neutral host network (NHN), enterprise (private), and hybrid network architectures useful with various aspects of the present disclosure.

FIG. 4a-2 is a graphical representation of typical prior art 3GPP MNO and NHN network architecture.

FIG. 4a-3 is a graphical representation of a first exemplary embodiment of a software architecture useful with the architecture of FIG. 4a.

FIG. 4a-4 is a graphical representation of a second exemplary embodiment of a software architecture useful with the architecture of FIG. 4a.

FIG. 4a-5 is a block diagram illustrating one embodiment of an MSO/MNO CBRS network Architecture configured for MNO subscriber roaming to the MSO network.

FIG. 5 is logical flow diagram of an exemplary method for enabling roaming MNO subscriber connectivity via a quasi-licensed band (e.g., CBRS) according to the present disclosure.

Figure 1:
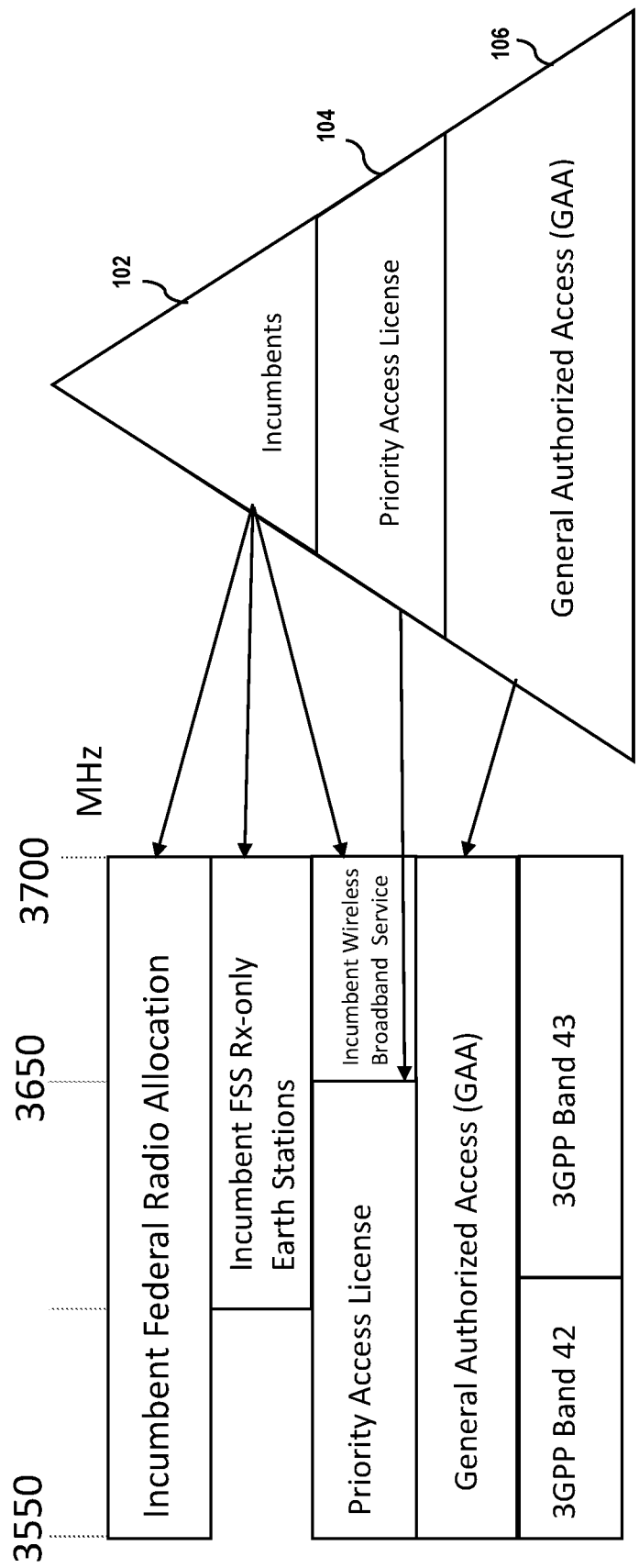
FIG. 1 is a graphical illustration of prior art CBRS (Citizens Broadband Radio Service) users and their relationship to allocated frequency spectrum in the 3.550 to 3.700 GHz band.

All figures © Copyright 2017 Charter Communications Operating, LLC. All rights reserved.

DETAILED DESCRIPTION

Reference is now made to the drawings wherein like numerals refer to like parts throughout.

As used herein, the term "access node" refers generally and without limitation to a network node which enables communication between a user or client device and another entity within a network, such as for example a CBRS CBSD, a Wi-Fi AP, or a Wi-Fi-Direct enabled client or other device acting as a Group Owner (GO).

As used herein, the term "application" (or "app") refers generally and without limitation to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could include a downloadable Java Xlet™ that runs within the JavaTV™ environment.

As used herein, the terms "client device" or "user device" or "UE" include, but are not limited to, set-top boxes (e.g., DSTBs), gateways, modems, personal computers (PCs), and minicomputers, whether desktop, laptop, or otherwise, and mobile devices such as handheld computers, PDAs, personal media devices (PMDs), tablets, "phablets", smartphones, and vehicle infotainment systems or portions thereof.

As used herein, the term "codec" refers to a video, audio, or other data coding and/or decoding algorithm, process or apparatus including, without limitation, those of the MPEG (e.g., MPEG-1, MPEG-2, MPEG-4/H.264, H.265, etc.), Real (RealVideo, etc.), AC-3 (audio), DiVX, XViD/ViDX, Windows Media Video (e.g., WMV 7, 8, 9, 10, or 11), ATI Video codec, or VC-1 (SMPTE standard 421M) families.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

As used herein, the term "DOCSIS" refers to any of the existing or planned variants of the Data Over Cable Services Interface Specification, including for example DOCSIS versions 1.0, 1.1, 2.0, 3.0 and 3.1.

As used herein, the term "headend" or "backend" refers generally to a networked system controlled by an operator (e.g., an MSO) that distributes programming to MSO clientele using client devices. Such programming may include literally any information source/receiver including, inter alia, free-to-air TV channels, pay TV channels, interactive TV, over-the-top services, streaming services, and the Internet.

As used herein, the terms "Internet" and "internet" are used interchangeably to refer to inter-networks including, without limitation, the Internet. Other common examples include but are not limited to: a network of external servers, "cloud" entities (such as memory or storage not local to a device, storage generally accessible at any time via a network connection, and the like), service nodes, access points, controller devices, client devices, etc.

As used herein, the term "LTE" refers to, without limitation and as applicable, any of the variants or Releases of the Long-Term Evolution wireless communication standard, including LTE-U (Long Term Evolution in unlicensed spectrum), LTE-LAA (Long Term Evolution, Licensed Assisted Access), LTE-A (LTE Advanced), 4G LTE, WiMAX, and other wireless data standards, including GSM, UMTS, CDMA2000, etc. (as applicable).

As used herein, the term "memory" includes any type of integrated circuit or other storage device adapted for storing digital data including, without limitation, ROM, PROM, EEPROM, DRAM, SDRAM, DDR/2 SDRAM, EDO/FPMS, RLDRAM, SRAM, "flash" memory (e.g., NAND/NOR), 3D memory, and PSRAM.

As used herein, the terms "microprocessor" and "processor" or "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer to a cable, satellite, or terrestrial network provider having infrastructure required to deliver services including programming and data over those mediums.

As used herein, the terms "MNO" or "mobile network operator" refer to a cellular, satellite phone, WMAN (e.g., 802.16), or other network service provider having infrastructure required to deliver services including without limitation voice and data over those mediums. The term "MNO" as used herein is further intended to include MVNOs, MNVAs, and MVNEs.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, LTE/LTE-A/LTE-U/LTE-LAA, WAP, SIP, UDP, FTP, RTP/RTCP, H.323, etc.).

As used herein, the term "network interface" refers to any signal or data interface with a component or network including, without limitation, those of the FireWire (e.g., FW400, FW800, etc.), USB (e.g., USB 2.0, 3.0. OTG), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), LTE/LTE-A/LTE-U/LTE-LAA, Wi-Fi (802.11), WiMAX (802.16), Z-wave, PAN (e.g., 802.15), or power line carrier (PLC) families.

As used herein, the term "QAM" refers to modulation schemes used for sending signals over e.g., cable or other networks. Such modulation scheme might use any constellation level (e.g. QPSK, 16-QAM, 64-QAM, 256-QAM, etc.) depending on details of a network. A QAM may also refer to a physical channel modulated according to the schemes.

As used herein, the term "server" refers to any computerized component, system or entity regardless of form which is adapted to provide data, files, applications, content, or other services to one or more other devices or entities on a computer network.

As used herein, the term "storage" refers to without limitation computer hard drives, DVR device, memory, RAID devices or arrays, optical media (e.g., CD-ROMs, Laserdiscs, Blu-Ray, etc.), or any other devices or media capable of storing content or other information. As used herein, the term "Wi-Fi" refers to, without limitation and as applicable, any of the variants of IEEE Std. 802.11 or related standards including 802.11 a/b/g/n/s/v/ac or 802.11-2012/2013, as well as Wi-Fi Direct (including inter alia, the "Wi-Fi Peer-to-Peer (P2P) Specification", incorporated herein by reference in its entirety).

As used herein, the term "wireless" means any wireless signal, data, communication, or other interface including without limitation Wi-Fi, Bluetooth/BLE, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), 802.20, Zigbee®, Z-wave, narrowband/FDMA, OFDM, PCS/DCS, LTE/LTE-A/LTE-U/LTE-LAA, analog cellular, CDPD, satellite systems, millimeter wave or microwave systems, acoustic, and infrared (i.e., IrDA).

Overview

In one exemplary aspect, the present disclosure provides improved methods and apparatus for wireless network access using, for example, "quasi-licensed" spectrum such as that provided by the recent CBRS technology initiatives. In an exemplary implementation, a network architecture is provided which leverages an MSO's extant distribution and backhaul capability to collect and exchange metrics between SAS, access networks (comprising of CBRS and other bands), access technologies such as LTE and Wi-Fi), DOCSIS and core networks, and execute a control and optimization function to enhance performance and user experience to its subscribers (and even non-subscriber "ad hoc" users), or provide wireless coverage where it would be otherwise not available, or in a complementary or parallel fashion to extant cellular or mobile service provided by "partnered" or cooperating Mobile (macro) Network Operators (MNOs), including for faster data rates in certain scenarios.

Additionally, differentiation among multiple services provided to users (whether MNO or MSO subscribers) is afforded via a policy engine (server), in light of (i) business agreements between the MSO and MNO(s) (ii) pre-defined services which require certain differentiated resource allocations, and (iii) input from analytics processes to support the formulation and implementation of the policies.

In one implementation, extant TD-LTE (Long Term Evolution) technology is leveraged within the available CBRS band(s) for improved venue (e.g., in-building) coverage and capacity augmentation for other unlicensed systems operating in other bands such as Wi-Fi, and/or for MNO-based licensed systems (e.g., to provide coverage where the MNO cannot via its licensed spectrum, or to provide a complementary or alternative service to the MNO-provided licensed spectrum services). This provides the network operator (e.g., MSO) and its users with a number of benefits, including inter alia: (i) obviating any need to adopt custom technology (e.g., a new air interface, and the new user mobile devices and MSO infrastructure that are necessitated thereby); (ii) reduced interference (and hence better user experience) due to less "crowding" in the lightly used CBRS quasi-licensed bands; and (iii) a complementary or "fallback" capability to the MNO's cellular coverage (as well as the MSO's extant WLAN services), such that the MNO user can be connected to the MNO core (and hence other MNO and non-MNO endpoints) via the MSO's quasi-licensed CBRS access points (i.e., CBSDs).

Additionally, the present disclosure provides methods and corresponding architecture to optimize and share a common CBRS small-cell cluster with one or more of the partnered/cooperating MNOs, including use of different priorities and/or service (e.g., QoS) requirements for different user traffic types (e.g., video/audio/data etc.). Moreover, in another implementation, traffic originating from and/or destined to different MNO partners can be prioritized or otherwise heterogeneously transacted based on e.g., agreements between the MSO and the various MNOs. This prioritization structure and/or heterogeneous treatment can further be extended across the MSO core and distribution network.

The MSO can advantageously leverage its high-bandwidth backhaul capabilities for the CBRS small-cells, whether for use by the MSO or its MNO partners. For instance, data to/from MNO subscribers present within an MSO-serviced CBRS cell may be "fast tracked" as compared to other non-MNO users. Moreover, cross-network optimizations can be accomplished, in effect treating the MSO and MNO networks as a common network for purposes of roaming MNO subscriber support.

Extant subscribers of the CBRS network can also "camp" on an MNO network for certain services which may not be offered by the CBRS provider (e.g. voice service), and CBRS network subscribers may utilize an MNO partner network for both voice and data when in a given geographic location that does not have any CBRS coverage.

Detailed Description of Exemplary Embodiments

Exemplary embodiments of the apparatus and methods of the present disclosure are now described in detail. While these exemplary embodiments are described in the context of the previously mentioned wireless access points (e.g., CBSDs and WLAN APs) associated with a managed network (e.g., hybrid fiber coax (HFC) cable architecture having a multiple systems operator (MSO), digital networking capability, IP delivery capability, and a plurality of client devices), the general principles and advantages of the disclosure may be extended to other types of radio access technologies ("RATs"), networks and architectures that are configured to deliver digital data (e.g., text, images, games, software applications, video and/or audio). Such other networks or architectures may be broadband, narrowband, or otherwise, the following therefore being merely exemplary in nature.

It will also be appreciated that while described generally in the context of a network providing service to a customer or consumer or end user or subscriber (i.e., within a prescribed venue, or other type of premises), the present disclosure may be readily adapted to other types of environments including, e.g., outdoors, commercial/retail, or enterprise domain (e.g., businesses), or even governmental uses, such as those outside the proscribed "incumbent" users such as U.S. DoD and the like. Yet other applications are possible.

Also, while certain aspects are described primarily in the context of the well-known Internet Protocol (described in, *inter alia, Internet Protocol DARPA Internet Program Protocol Specification*, IETF RCF 791 (September 1981) and Deering et al., *Internet Protocol, Version 6 (IPv6) Specification*, IETF RFC 2460 (December 1998), each of which is incorporated herein by reference in its entirety), it will be appreciated that the present disclosure may utilize other types of protocols (and in fact bearer networks to include other internets and intranets) to implement the described functionality.

Moreover, while the current SAS framework is configured to allocate spectrum in the 3.5 GHz band (specifically 3,550 to 3,700 MHz), it will be appreciated by those of ordinary skill when provided the present disclosure that the methods and apparatus described herein may be configured to utilize other "quasi licensed" or other spectrum, including without limitations above 4.0 GHz (e.g., currently proposed allocations up to 4.2 GHz).

Moreover, while described in the context of exemplary LTE (3GPP) based air interface technologies, it will be appreciated that the various aspects of the present disclosure may be adapted to other air interfaces, including for example non-OFDM air interfaces such as DSSS/CDMA, FHSS, and FDMA/TDMA.

Other features and advantages of the present disclosure will immediately be recognized by persons of ordinary skill in the art with reference to the attached drawings and detailed description of exemplary embodiments as given below.

Service Provider Network—

Figure 3A:
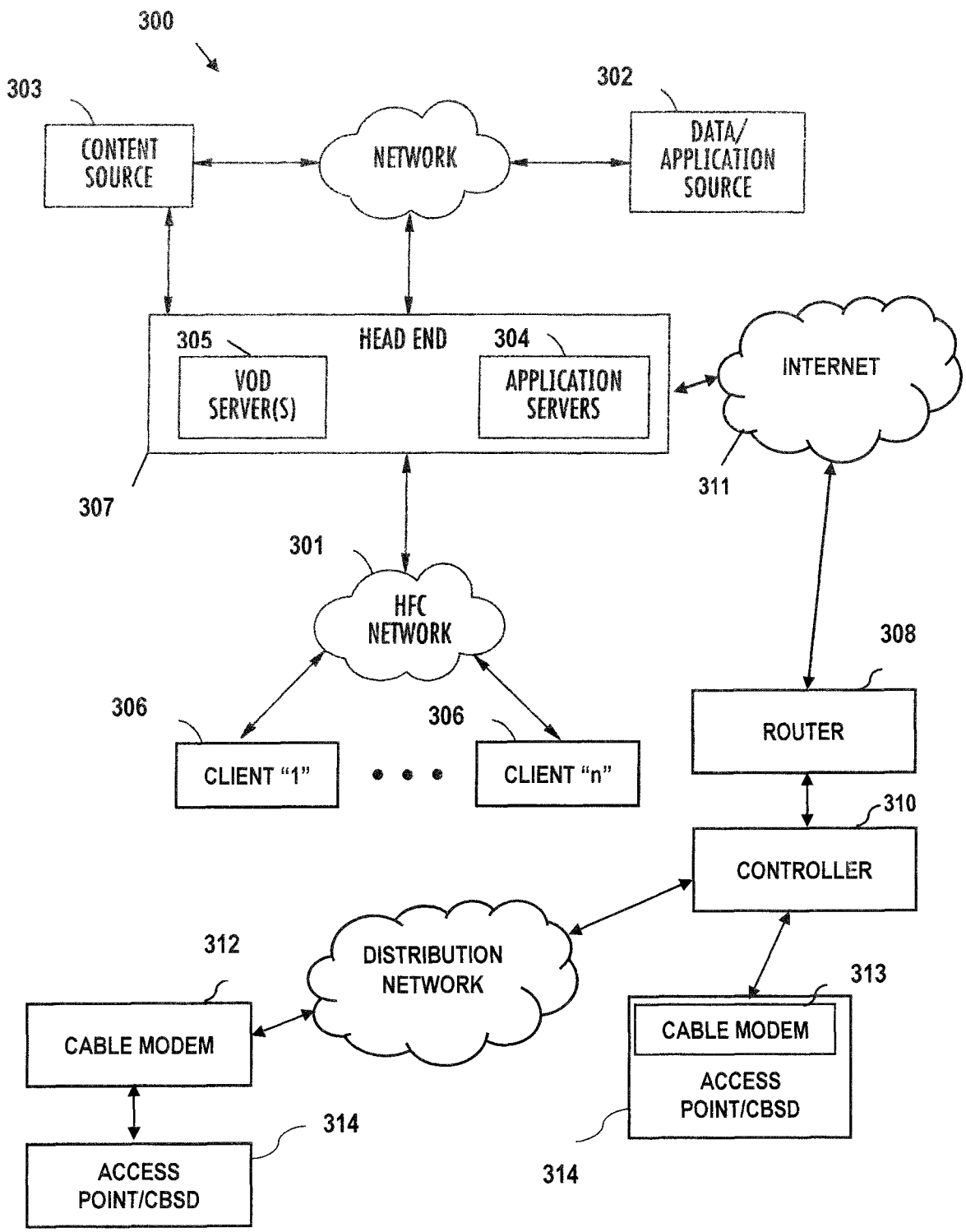
FIG. 3a is a functional block diagram illustrating an exemplary hybrid fiber network configuration useful with various aspects of the present disclosure.

FIG. 3a illustrates a typical service provider network configuration useful with the features of the CBRS-based wireless network(s) described herein. This service provider network 300 is used in one embodiment of the disclosure to provide backbone and Internet access from the service provider's wireless access nodes (e.g., CBSDs, Wi-Fi APs or base stations 314 operated or maintained by the service provider or its customers/subscribers), one or more standalone or embedded cable modems (CMs) 312, 313 in data communication therewith, or even third party access points accessible to the service provider via, e.g., an interposed network such as the Internet 311 (e.g., with appropriate permissions from the access node owner/operator/user).

As described in greater detail subsequently herein with respect to FIG. 4a, one or more controllers 310 are utilized for, inter alia, control of the wireless network access nodes 314 at least partly by the MSO. As opposed to an unmanaged network, the managed service-provider network 300 of FIG. 3a advantageously allows, inter alia, control and management of a given user's access (such user which may be a network subscriber, or merely an incidental/opportunistic user of the service) via the wireless access node(s) 314, including imposition and/or reconfiguration of various access "rules" or other configurations applied to the wireless access nodes. For example, the service provider network 300 allows components at an indoor venue of interest (e.g., CBSDs, Wi-Fi APs and any supporting infrastructure such as routers, switches, etc.) to be remotely reconfigured by the network MSO, based on e.g., prevailing operational conditions in the network, changes in user population and/or makeup of users at the venue, business models (e.g., to maximize profitability or provide other benefits such as enhanced user experience, as described infra), spectrum channel changes or withdrawals, or even simply to enhance user experience using one RAT (e.g., CBRS) when another RAT (e.g., WLAN is sub-optimal for whatever reason).

In certain embodiments, the service provider network 300 also advantageously permits the aggregation and/or analysis of subscriber- or account-specific data (including inter alia, particular mobile devices associated with such subscriber or accounts) as part of the provision of services to users under the exemplary delivery models described herein. As but one example, device-specific IDs (e.g., MAC address or the like) can be cross-correlated to MSO subscriber data maintained at e.g., the network head end(s) 307 so as to permit or at least facilitate, among other things, (i) user authentication; (ii) correlation of aspects of the event or venue to particular subscriber demographics, such as for delivery of targeted advertising; and (iii) determination of subscription level, and hence subscriber privileges and access to content/features. Moreover, device profiles for particular user devices can be maintained by the MSO, such that the MSO (or its automated proxy processes) can model the user device for wireless capabilities.

The wireless access nodes 314 disposed at the service location(s) (e.g., venue(s) of interest) can be coupled to the bearer managed network 300 (FIG. 3a) via, e.g., a cable modem termination system (CMTS) and associated local DOCSIS cable modem (CM) 312, 313, a wireless bearer medium (e.g., an 802.16 WiMAX or millimeter wave system—not shown), a fiber-based system such as FiOS or similar, a third-party medium which the managed network operator has access to (which may include any of the foregoing), or yet other means.

The various components of the exemplary embodiment of the network 300 generally include (i) one or more data and application origination sources 302; (ii) one or more content sources 303, (iii) one or more application distribution servers 304; (iv) one or more video-on-demand (VOD) servers 305, (v) client devices 306, (vi) one or more routers 308, (vii) one or more wireless access node controllers 310 (may be placed more locally as shown or in the headend or "core" portion of network), (viii) one or more cable modems 312, 313, and/or (ix) one or more access nodes 314. The application server(s) 304, VOD servers 305 and client device(s) 306 are connected via a bearer (e.g., HFC) network 301. A simple architecture comprising one of each of certain components 302, 303, 304, 305, 308, 310 is shown in FIG. 3a for simplicity, although it will be recognized that comparable architectures with multiple origination sources, distribution servers, VOD servers, controllers, and/or client devices (as well as different network topologies) may be utilized consistent with the present disclosure.

It is also noted that cable network architecture is typically a "tree-and-branch" structure, and hence multiple tiered access nodes 314 (and other components) may be linked to each other or cascaded via such structure.

Figure 3B:
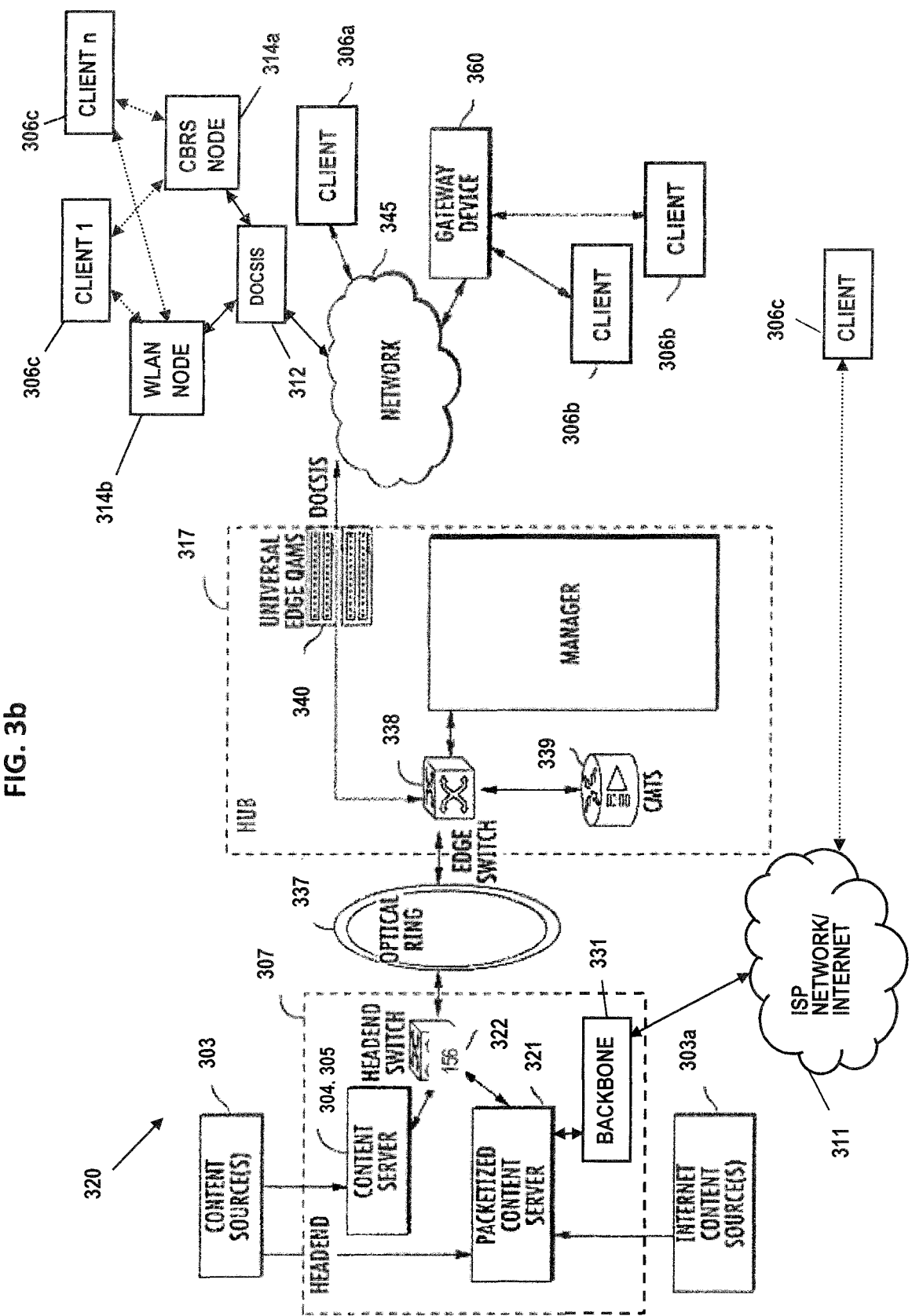
FIG. 3b is a functional block diagram of an exemplary packetized content network architecture useful in conjunction with various principles described herein.

FIG. 3b illustrates an exemplary high-level MSO network architecture for the delivery of packetized content (e.g., encoded digital content carried within a packet or frame structure or protocol) that may be useful with the various aspects of the present disclosure. In addition to on-demand and broadcast content (e.g., live video programming), the system of FIG. 3b may deliver Internet data and OTT (over-the-top) services to the end users (including those of the access nodes 314) via the Internet protocol (IP) and TCP, although other protocols and transport mechanisms of the type well known in the digital communication art may be substituted.

The network architecture 320 of FIG. 3b generally includes one or more headends 307 in communication with at least one hub 317 via an optical ring 337. The distribution hub 317 is able to provide content to various user/client devices 306, and gateway devices 360 as applicable, via an interposed network infrastructure 345.

As described in greater detail below, various content sources 303, 303a are used to provide content to content servers 304, 305 and origin servers 321. For example, content may be received from a local, regional, or network content library as discussed in co-owned U.S. Pat. No. 8,997,136 entitled "APPARATUS AND METHODS FOR PACKETIZED CONTENT DELIVERY OVER A BANDWIDTH-EFFICIENT NETWORK", which is incorporated herein by reference in its entirety. Alternatively, content may be received from linear analog or digital feeds, as well as third party content sources. Internet content sources 303a (such as e.g., a web server) provide Internet content to a packetized content origin server(s) 321. Other IP content may also be received at the origin server(s) 321, such as voice over IP (VoIP) and/or IPTV content. Content may also be received from subscriber and non-subscriber devices (e.g., a PC or smartphone-originated user made video).

The centralized media server(s) 321, 304 located in the headend 307 may also be replaced with or used in tandem with (e.g., as a backup) to hub media servers (not shown) in one alternative configuration. By distributing the servers to the hub stations 317, the size of the fiber transport network associated with delivering VOD services from the central headend media server is advantageously reduced. Multiple paths and channels are available for content and data distribution to each user, assuring high system reliability and enhanced asset availability. Substantial cost benefits are derived from the reduced need for a large content distribution network, and the reduced storage capacity requirements for hub servers (by virtue of the hub servers having to store and distribute less content).

It will also be recognized that a heterogeneous or mixed server approach may be utilized consistent with the disclosure. For example, one server configuration or architecture may be used for servicing cable, satellite, etc., subscriber CPE-based session requests (e.g., from a user's DSTB or the like), while a different configuration or architecture may be used for servicing mobile client requests. Similarly, the content servers 321, 304 may either be single-purpose/dedicated (e.g., where a given server is dedicated only to servicing certain types of requests), or alternatively multi-purpose (e.g., where a given server is capable of servicing requests from different sources).

The network architecture 320 of FIG. 3b may further include a legacy multiplexer/encrypter/modulator (MEM; not shown). In the present context, the content server 304 and packetized content server 321 may be coupled via a LAN to a headend switching device 322 such as an 802.3z Gigabit Ethernet (or "10G") device. For downstream delivery via the MSO infrastructure (i.e., QAMs), video and audio content is multiplexed at the headend 307 and transmitted to the edge switch device 338 (which may also comprise an 802.3z Gigabit Ethernet device) via the optical ring 337.

In one exemplary content delivery paradigm, MPEG-based video content (e.g., MPEG-2, H.264/AVC) may be delivered to user IP-based client devices over the relevant physical transport (e.g., DOCSIS channels); that is as MPEG-over-IP-over-MPEG. Specifically, the higher layer MPEG or other encoded content may be encapsulated using an IP network-layer protocol, which then utilizes an MPEG packetization/container format of the type well known in the art for delivery over the RF channels or other transport, such as via a multiplexed transport stream (MPTS). In this fashion, a parallel delivery mode to the normal broadcast delivery exists; e.g., in the cable paradigm, delivery of video content both over traditional downstream QAMs to the tuner of the user's DSTB or other receiver device for viewing on the television, and also as packetized IP data over the DOCSIS QAMs to the user's PC or other IP-enabled device via the user's cable modem 312 (including to end users of the access node 314). Delivery in such packetized modes may be unicast, multicast, or broadcast.

Delivery of the IP-encapsulated data may also occur over the non-DOCSIS QAMs, such as via IPTV or similar models with QoS applied.

Individual client devices such as cable modems 312 and associated end-user devices 306a, 306b of the implementation of FIG. 3b may be configured to monitor the particular assigned RF channel (such as via a port or socket ID/address, or other such mechanism) for IP packets intended for the subscriber premises/address that they serve. The IP packets associated with Internet services are received by edge switch, and forwarded to the cable modem termination system (CMTS) 339. The CMTS examines the packets, and forwards packets intended for the local network to the edge switch. Other packets are in one variant discarded or routed to another component.

The edge switch forwards the packets receive from the CMTS to the QAM modulator, which transmits the packets on one or more physical (QAM-modulated RF) channels to the client devices. The IP packets are typically transmitted on RF channels that are different than the "in band" RF channels used for the broadcast video and audio programming, although this is not a requirement. As noted above, the premises devices such as cable modems 312 are each configured to monitor the particular assigned RF channel (such as via a port or socket ID/address, or other such mechanism) for IP packets intended for the subscriber premises/address that they serve.

In one embodiment, both IP data content and IP-packetized audio/video content is delivered to a user via one or more universal edge QAM devices 340. According to this embodiment, all of the content is delivered on DOCSIS channels, which are received by a premises gateway 360 or cable modem 312, and distributed to one or more respective client devices/UEs 306a, 306b, 306c in communication therewith.

In one implementation, the CM 312 shown in FIG. 3b services a venue, such as a conference center or hospitality structure (e.g., hotel), which includes a CBRS node 314a for CBRS-band (3.5 GHz) access, and a WLAN (e.g., Wi-Fi) node 314b for WLAN access (e.g., within 2.4 GHz ISM band). Notably, the client devices 306c communicating with the access nodes 314a, 314b, as described in greater detail subsequently herein, can utilize either RAT (CBRS or WLAN) depending on, inter alia, directives received from the MSO controller 310 (FIG. 3a) via one access node 314 or the other, or even indigenous logic on the client device 306c enabling it to selectively access one RAT or the other. Feasibly, both RATs could operate in tandem, since they utilize different frequencies, modulation techniques, interference mitigation techniques, Tx power, etc.

In parallel with (or in place of) the foregoing delivery mechanisms, the MSO backbone 331 and other network components can be used to deliver packetized content to the user's mobile client device 306c via non-MSO networks. For example, so-called "OTT" content (whether tightly coupled or otherwise) can be ingested, stored within the MSO's network infrastructure, and delivered to the user's mobile device via an interposed ISP (Internet Service Provider) network and public Internet 311 (e.g., at a local coffee shop, via a Wi-Fi AP connected to the coffee shop's ISP via a modem, with the user's IP-enabled end-user device 306c utilizing an Internet browser or MSO/third-party app to stream content according to an HTTP-based approach).

Wireless Services Architecture—

Figure 4A:
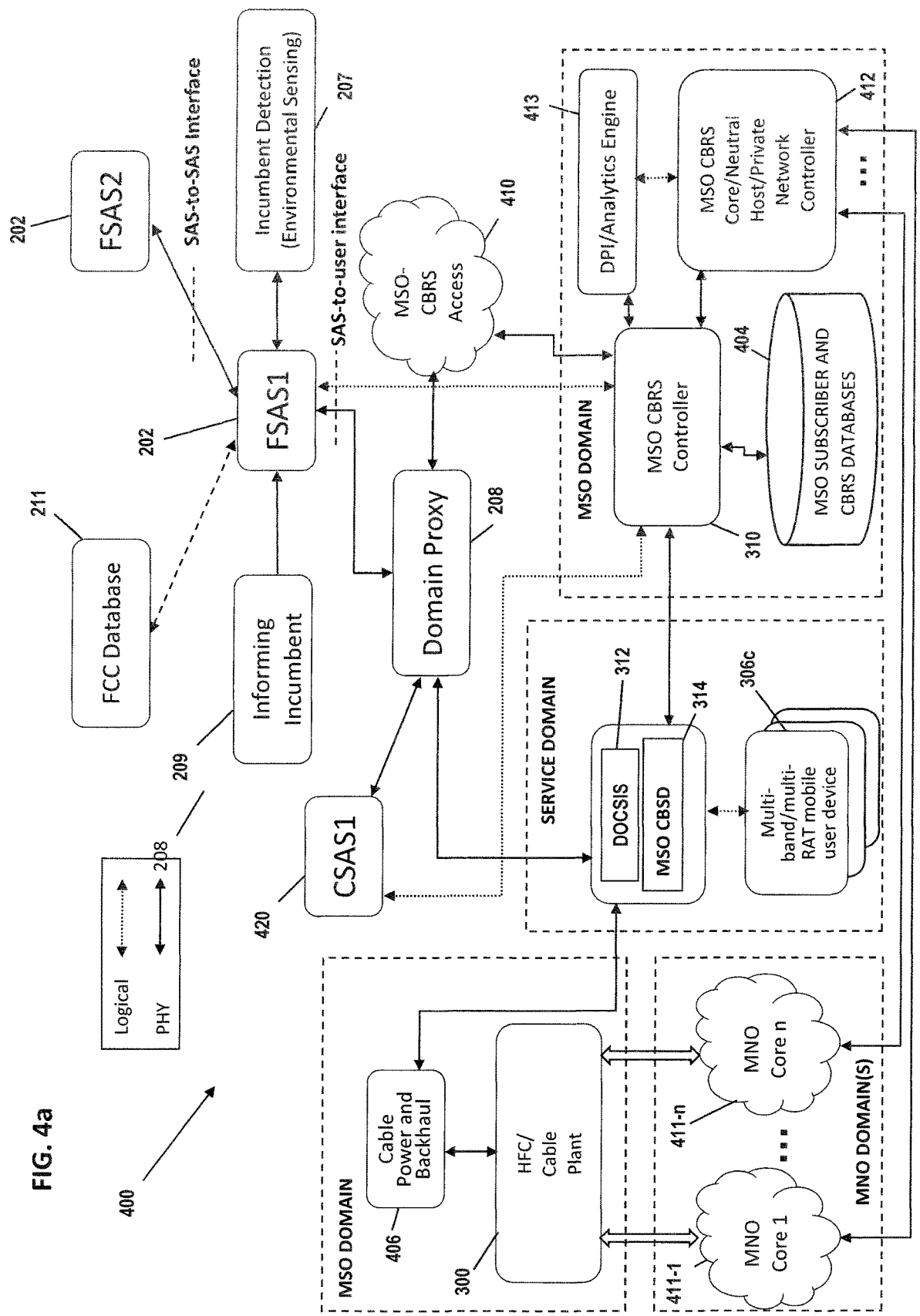
FIG. 4a is a functional block diagram of a first exemplary embodiment of a quasi-licensed wireless network infrastructure useful with various aspects of the present disclosure.
Figures 2, 4A:
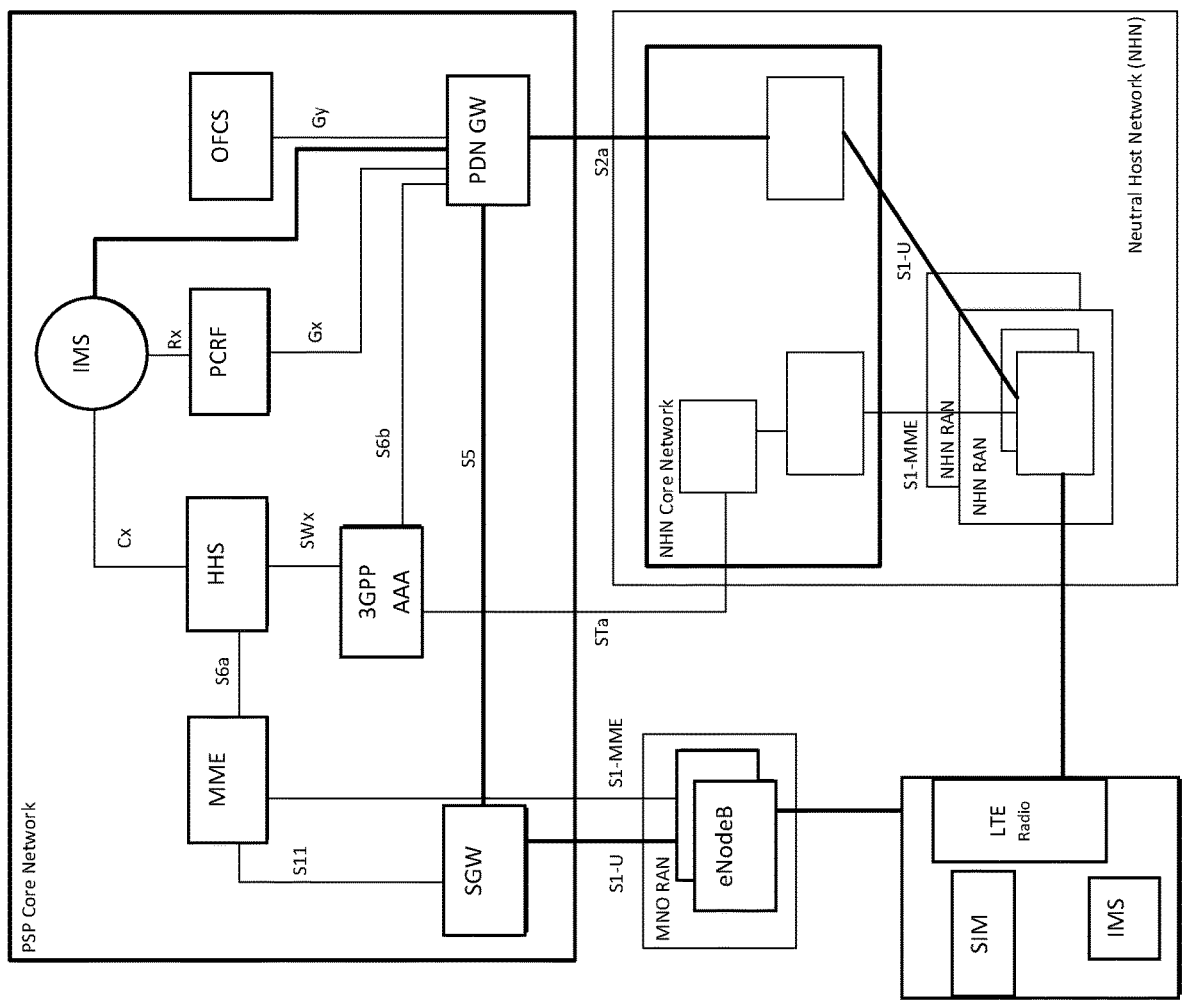

FIG. 4a illustrates an exemplary embodiment of a network architecture 400 useful in implementing the CBRS-based wireless RAT access and MNO roaming methods of the present disclosure. As used in the present context, the term "users" may include without limitation end users (e.g., individuals, whether subscribers of the MSO network, the MNO network, or other), venue operators, third party service providers, or even entities within the MSO itself (e.g., a particular department, system or processing entity).

As shown, the architecture generally includes an MSO-maintained CBRS controller 310 (which may be disposed remotely at the backend or headend of the system within the MSO domain as shown or at the served venue, or at an intermediary site), a CBRS Core/Neutral Host/Private Network Controller 413, a deep packet inspection (DPI)/analytics engine 413 in data communication with the CBRS controller 310, an MSO-maintained subscriber and CBRS database 404, one or more CBSD access nodes 314 in data communication with the CBRS controller 310 (e.g., via existing network architectures including any wired or wireless connection), as well as any number of client devices 306c (smartphones, laptops, tablets, watches, vehicles, etc.). The CBSD 314 includes in the illustrated embodiment an embedded cable modem 312 used for communication with a corresponding CMTS 339 (FIG. 3b) within the MSO's (e.g., cable) plant 300 via cable power and backhaul infrastructure 406, including high-data bandwidth connections to the MSO's backbone 331, and electrical power for the CBSD A MNO (mobile network operator) network 411 also communicates with the MSO network via the backhaul 406, such as for inter-operator communications regarding common users/sub scribers.

In the present context, a Neutral-Host-Network (NHN) is a Radio Access Network (RAN) deployed in 3.5 GHz band, with an associated NHN core. For instance, in one implementation, the MSO acts as an NHN provider via, inter alia, its provision of the CBRS RAN.

As shown in FIG. 4a-1, both the NHN RAN and core may be used to provide/offer services to the subscribers of the MSO's MNO partners, including access to the MNO core via the NHN (MSO) RAN and core.

Conversely, in a private network (or enterprise network) (also shown in FIG. 4a-1), a private entity uses the RAN (e.g., CBRS-based RAN) for its own exclusive use, exclusive of any MNO partners or their subscribers.

In a hybrid network (see again FIG. 4a-1), a CBRS core and RAN can serve UEs having multiple subscriptions (e.g., for the private or enterprise MSO, and the cellular MNO) to provide both the enterprise as well as MNO services through the common CBRS RAN and core.

Figure 2:
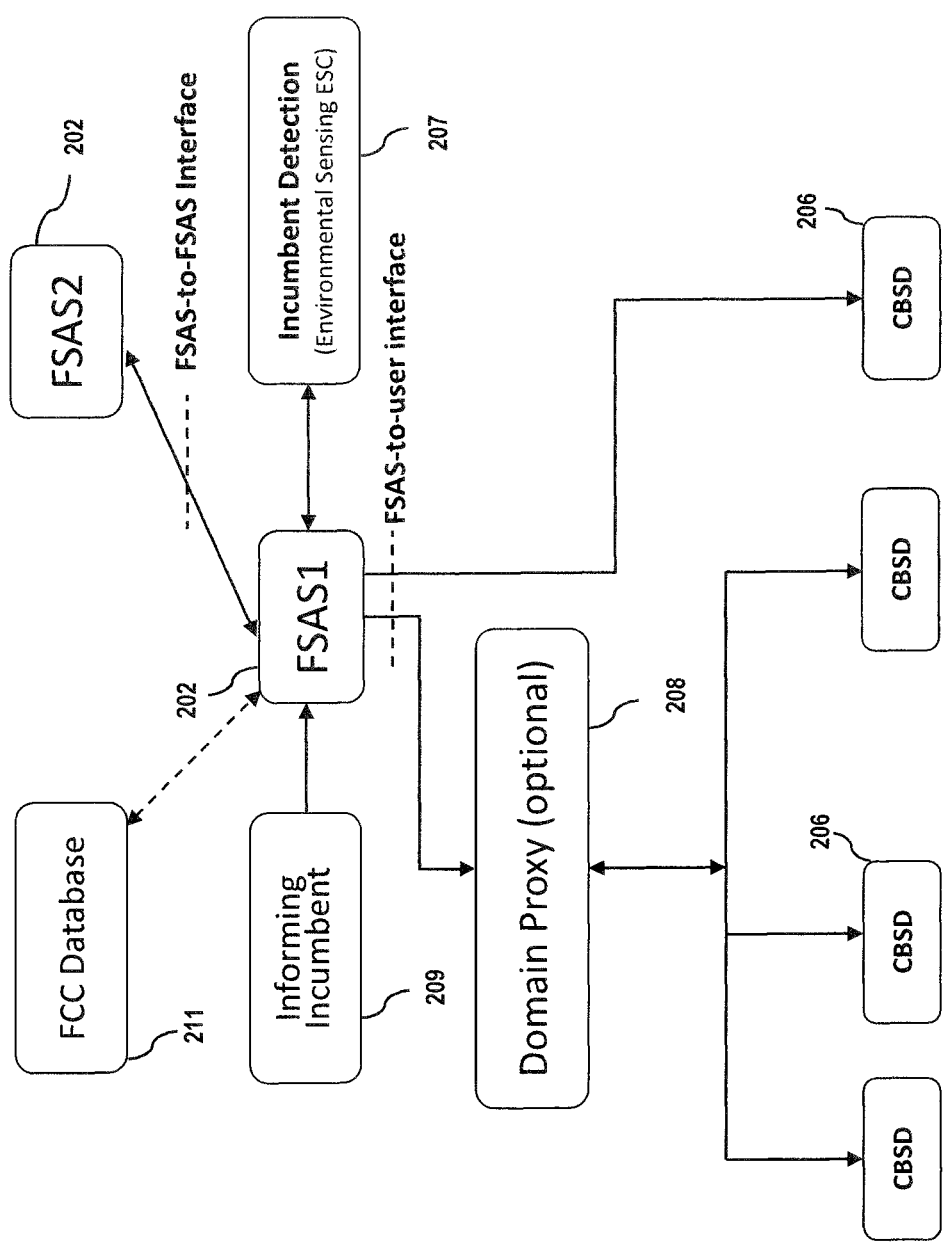
FIG. 2 is a block diagram illustrating a general architecture for the CBRS system of the prior art.
Figure 2A:
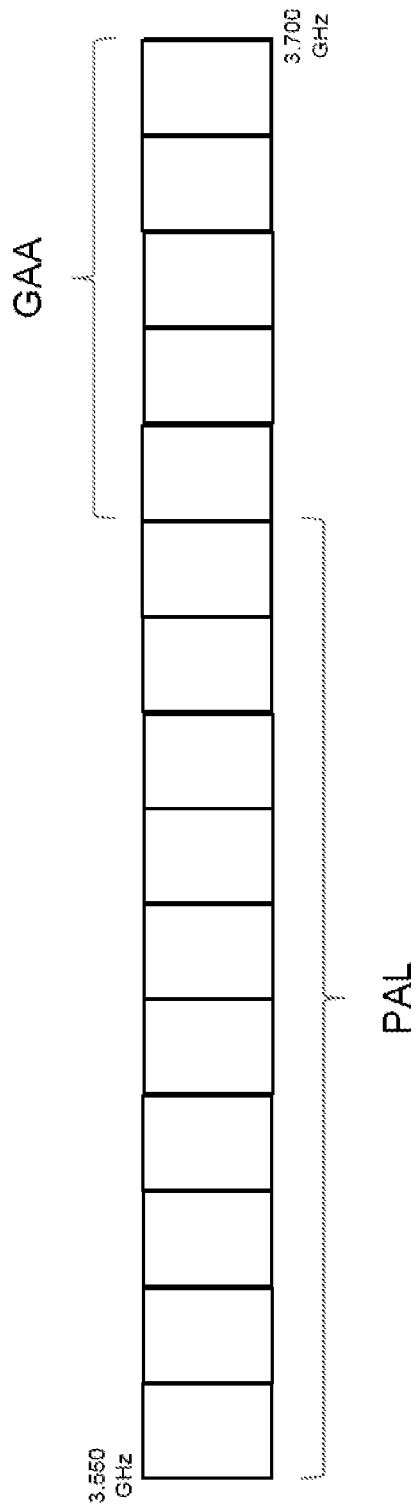
FIG. 2a is a graphical representation of allocations for PAL versus GAA users within the frequency band of FIG. 2.

In the present context (i.e., CBRS RAN), the neutral host network (NHN) can be implemented as another LTE network by an entity different than the MNO (i.e., the MSO or a proxy thereof), in contrast to conventional 3GPP architectures (see FIG. 4a-2) wherein an NHN gateway (NHN-GW; connected to the packet data network gateway (PDN-GW) of the MNO in FIG. 4a-2), can interface with any access network. For instance, in one implementation according to the present disclosure, traffic originating from/destined to any of the MNO partner networks may be prioritized and provided differentiated treatment within the MSO CBRS network (such differentiation with a RAN based on, inter alia, MNO partner identity not being supported in the prior art architecture shown). Additionally, different types of traffic (voice/video/data etc.) may be provided different treatment within the CBRS network, across the MSO (e.g., cable) network in the backhaul, and across the relevant MNO partner interface, as well as being differentiated between different MNO partners. The optimization of this traffic to/from multitude of MNO partners may be based on network policies, agreements with MNOs, network analytics across CBRS RAN, CBRS core and MNO operator interfaces.

Referring again to FIG. 4a, in operation, the Domain Proxy (DP) 208 is in logical communication with the CBSD disposed at the venue (either directly, as shown, or via MSO backend network infrastructure) and the MSO CBRS controller 310. The DP 208 provides, inter alia, FSAS interface for the CBSD, including directive translation between CBSD 314 and FSAS commands, bulk CBSD directive processing, and interference contribution reporting to the FSAS (i.e., to help an SAS tune or update its predictive propagation models and detect realistic interference issues once CBSDs are deployed, the CBSDs can provide signal strength and interference level measurements).

The MSO controller 310 in the illustrated embodiment communicates with the DP 208 via an MSO CBRS access network 410, which may be a public internetwork (e.g., the Internet), private network, or other, depending on any security and reliability requirements mandated by the MSO and/or SAS.

As previously noted, a CBRS "domain" is defined as any collection of CBSDs 314 that need to be grouped for management; e.g.: large enterprises, venues, etc. The DP 208 aggregate control information flows to the FSAS1 202 and/or any participating Commercial SAS (CSAS) 420, and generate performance reports, channel requests, heartbeats, and other types of data. In the illustrated embodiment, the DP 208 is operated by a third-party service provider, although it will be appreciated that the MSO may operate and maintain the DP 208, and or operate/maintain its own internal DP (as in FIG. 4b), such as for channel request processing, aggregation, reporting, and other of the above-listed functions for the MSO's internal CBRS domains, for interface with an external DP 208.

Figures 3, 4A:
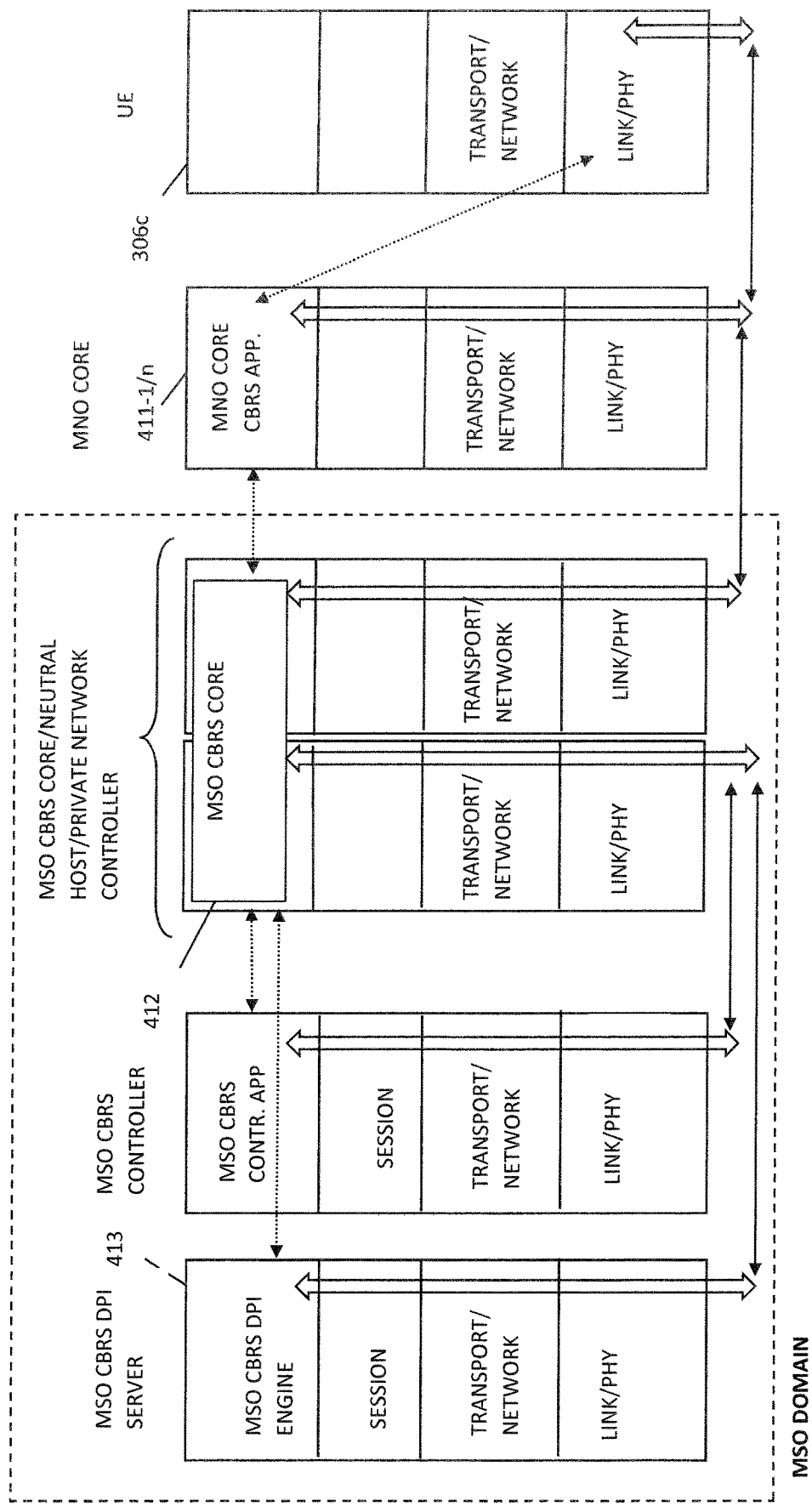

The MSO controller 310 communicates logically with the DPI server engine 413, as well as the MSO core function 412 as shown in FIG. 4a-3. In one embodiment, the MSO core 412 further communicates with the MNO core 411, such as via an application or other computer program operative within the relevant MNO core entity. Also as shown in FIG. 4a-3, the MNO core 411 controls the link layer/PHY of the UE (i.e., via LTE-FDD signaling and operation between an eNB of the MNO network and the UE), such that the UE PHY can be configured to, inter alia, scan the relevant 3.5 GHz band(s) for energy in support of UE "entry" into the MSO CBRS RAN, and operate within the CBRS RAN in LTE-TDD mode. This approach requires at least some level of communication between the UE and its home MNO network (or at least another MNO network which it is visiting which can maintain an LTE-FDD link to an eNB); once the UE loses contact with the home or visited LTE-FDD (cellular) network, it will not be able to enter the MSO CBRS RAN (at least without prior configuration of its RF functions to do so).

Figures 4, 4A:
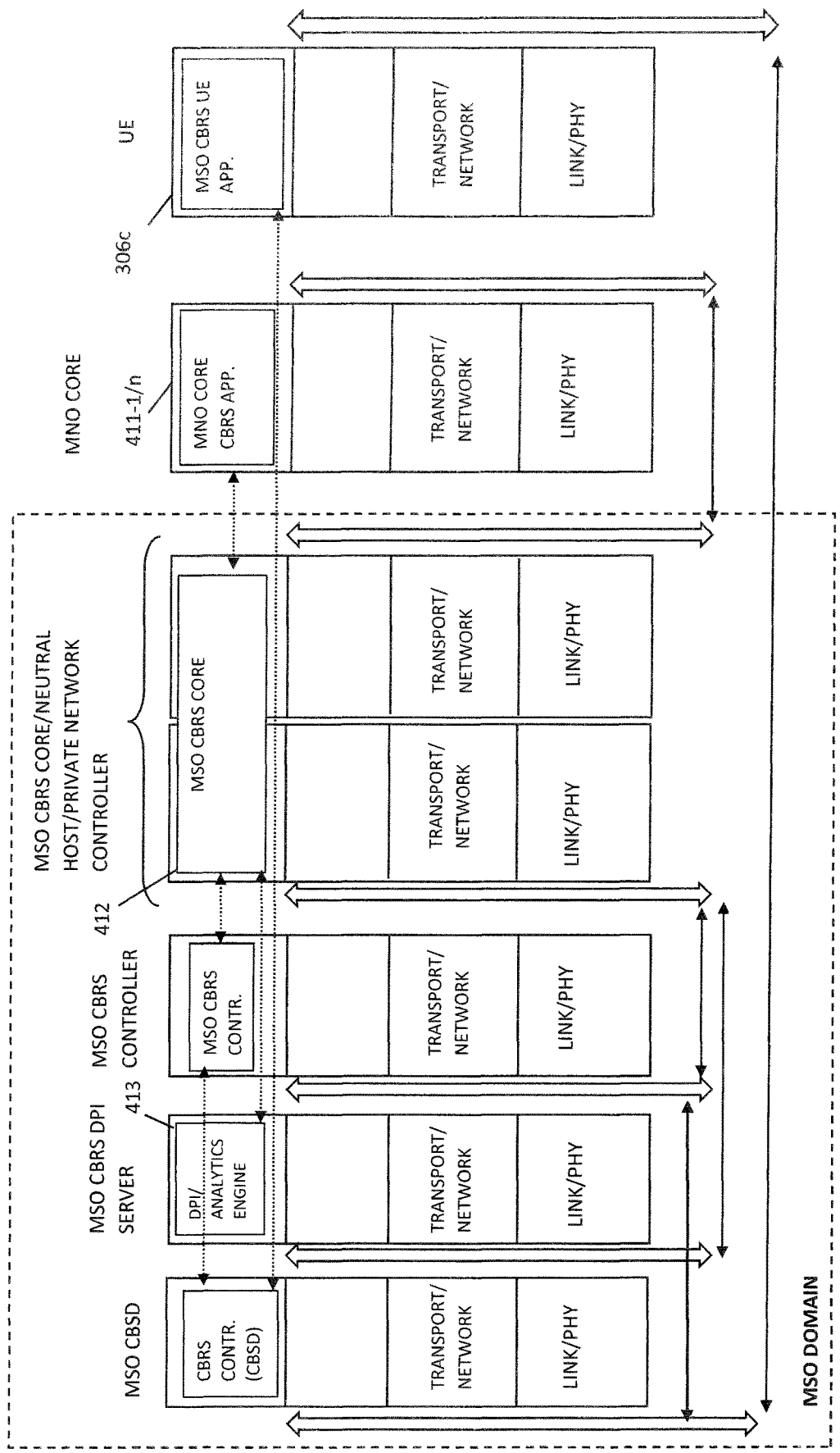

FIG. 4a-4 illustrates another exemplary software architecture according to the disclosure. In this embodiment, the UE includes a CBRS client application, which is communicative with the CBRS controller application via the CBSD (e.g., via a client portion of the CBRS controller app. installed on the CBSD). This way, the CBRS UE functionality (including any software-defined radio functions such as retuning or configuring the UE RF front end for the CBSD 3.5 GHz band(s)) can be invoked by the MSO network directly, rather than through MNO UE/EUTRAN core functionality (e.g., while the UE is communicative with the MNO eNB as described above with respect to FIG. 4a-3).

Returning again to FIG. 4a, the MSO subscriber and CBRS database 404 includes several types of data useful in operation of the system 400. As part thereof, a client device database not shown is also provided, wherein the MSO CBRS controller 310 can access and store data relating to, inter alia: (i) individual client devices, such as MAC address or other specific identifying information, (ii) any associated subscriber accounts or records, (iii) the LTE (and optionally WLAN) configuration of the client, supported LTE/Wi-Fi variants, MCS, MIMO capability, etc.

The client database may also optionally include the multi-RAT provisioning status of the particular client (e.g., whether the client has had a connection manager (CM) application installed, status of "pushed" configuration data to the installed CM, etc.). As described in greater detail below with respect to FIG. 4b, one implementation of the CBRS system of the present disclosure utilizes MSO-provisioned client device CM apps which enable the client device to configure and manage its various air interfaces (including WLAN, CBRS-LTE, and non-CBRS LTE). Also, client-provided and MNO-provided data on roaming users may be maintained within the CBRS client DB 404.

The MSO database 404 also includes a CBRS database, which in the illustrated embodiment retains data relating to, among other things: (i) CBSD identification (e.g., MAC), (ii) CBSD location, (iii) association with parent or child nodes or networks (if any), and (iv) CBRS configuration and capabilities data. The CBRS database 404 may also include MSO-maintained data on spectrum usage and historical patterns, channel withdrawals, and other data which enable the MSO to proactively "plan" channel usage and allocation within the venue(s) of interest where the CBSD(s) 314 operate.

The MSO CBRS controller 310 includes, inter alia, optimization functions which take into consideration network state and topology, (e.g., for access networks spanning across multiple access bands and technologies, cable backhaul and the core network, such as where a 2.4 GHz Wi-Fi access network together with 2.5 GHZ and 3.5 Ghz LTE network, cable backhaul and MSO (cable) core together can be optimized), loading, and user requirements, and generate standardized requests to the FSAS1 202 or CSAS1 420 services via the DP 208. The controller 310 also "tunes" the response from FSAS/CSAS before sending it to the CBSDs 314. Specifically, in one particular implementation, mobility optimization is performed by the controller 310 by taking FSAS/CSAS channel change, withdrawal, and power change, and other self-optimizing network (SON) functions into account, as described in greater detail subsequently herein. The FSAS/CSAS response is first analyzed by the controller logic as to the number of affected downstream devices (e.g., how many small cells or other CBSDs are affected), and the instructions sent to the individual CBSDs in phases/groups, or according to some other scheme so as to mitigate the impact on the UEs (yet consistent with FSAS/CSAS and CBRS system requirements). In this fashion, an individual UE can be "moved around" to other CBSDs and/or frequency bands to the extent possible, and user experience preserved (i.e., little or no discontinuity in service is perceived).

In certain embodiments, each CBSD 314 is located within and/or services one or more areas within one or more venues (e.g., a building, room, or plaza for commercial, corporate, academic purposes, and/or any other space suitable for wireless access). Each CBSD 314 is configured to provide wireless network coverage within its coverage or connectivity range. For example, a venue may have a wireless modem installed within the entrance thereof for prospective customers to connect to, including those in the parking lot via inter alia, their LTE-enabled vehicles or personal devices of operators thereof. Notably, different classes of CBSD 314 (e.g., eNB) may be utilized. For instance, Class A eNBs can transmit up 30 dbm (1 watt), while Class-B eNBs can transmit up to 50 dbm, so the average area can vary widely. In practical terms, a Class-A device may have a working range on the order of hundreds of feet, while a Class B device may operate out to thousands of feet or more, the propagation and working range dictated by a number of factors, including the presence of RF or other interferers, physical topology of the venue/area, energy detection or sensitivity of the receiver, etc.

In the exemplary embodiment, one or more CBSDs 314 may be indirectly controlled by the CBRS controller 310 (i.e., via infrastructure of the MSO network), or directly controlled by a local or "client" CBRS controller disposed at the venue (not shown). Various combinations of the foregoing direct and indirect control may be implemented within the architecture 400 of FIG. 4a as desired. The controller 310 is implemented in this instance as a substantially unified logical and physical apparatus maintained within the MSO domain, such as at an MSO headend or hubsite, and in communication with the MNO core 411 via the MSO core function 412. In the embodiment of FIG. 4a, the controller 310 is configured to at least: (i) dynamically monitor RF conditions and performance information in the hosting environment via use of the CBSDs 314a; (ii) cause issuance of interference reports based on the data of (i) for transmission to the DP 208 (and forwarding to the FSAS/CSAS) (iii) cause issuance of spectrum requests to the DP 208 (for forwarding to the cognizant FSAS 202 or CSAS 420), as well as implementing the QoS and policy functions for the roaming MNO users as described in greater detail below.

The controller 310 also optionally includes algorithms to optimize operation of the "local" CBRS network maintained by the MSO, such as within a target venue or area. These optimizations may include for example: (a) utilization of the environmental interference data of (i) above to characterize the CBRS band(s) of the venue/area; (b) use the characterization of (a) to structure requests for spectrum allocation within the CBRS band(s) to the DP/SAS (e.g., which will mitigate interference or contention within the venue/are in those bands); (c) use the interference data of (i) above, and other relevant data (e.g., attendance, time, interference/signal as a function of CBSD location, etc.) to build historical profiles of spectrum use a function of various variables, including profiles particular to the venue/area itself, as described in co-owned U.S. patent application Ser. No. 15/612,630 filed Jun. 2, 2017 entitled "APPARATUS AND METHODS FOR PROVIDING WIRELESS SERVICE IN A VENUE," and issued as U.S. Pat. No. 10,645,547 on May 5, 2020, incorporated herein by reference in its entirety; (d) utilize data regarding spectrum availability withdrawals (e.g., where DoD assets require use of a previously allocated band) and other events to generate predictive or speculative models on CBRS band utilization as a function of time.

In addition to the foregoing, the controller 310 may be configured to actively or passively coordinate MSO user/subscriber RAT and band allocations between CBSDs (using CBRS allocated spectrum at approximately 3.5 GHz) and e.g., Wi-Fi use of 2.4 or 5 GHz bands of ISM, so as to optimize user experience, as described in greater detail below with respect to FIG. 4c. See, e.g., the exemplary methods and apparatus described in co-pending and co-owned U.S. patent application Ser. No. 15/677,940 previously incorporated herein.

In the exemplary embodiment, optimization functions within the MSO controller 310 takes into consideration (i) network state (both MSO and MNO networks), (ii) MSO small cell network topology, (iii) current MSO small cell network load, and (iv) user-specific requirements, and generate a standardized request to the SAS service based thereon (the "standardization" refers to the protocols/request mechanism used in contacting the SAS). The optimization functions of the controller 310 also "tune" the response from the SAS entity before sending it to the CBSD 314 and MNO Core 412 (see FIGS. 4a and 6). For instance, the SAS may allocate certain resources for certain periods of time, which may be yet further optimized by the controller 310 for particulars of the MSO CBRS RAN (e.g., known problematic frequency bands deleted from the allocation, etc.). In one implementation, the aforementioned tuning includes adjusting the transmission power of each individual small cell in the CBRS network while adhering to the maximum limits mandated by SAS, taking into account load in terms of both (i) amount of traffic carried, and (ii) number of users served by each individual cell in the CBRS network. Based on this information, users from the MNO partner can be accepted, rejected at a given small cell within the CBRS network, and/or migrated to other cells).

Moreover, such tuning can include correlating QoS policies or requirements applied to individual services (e.g., uplink/downlink throughput) to subscriber profiles, such that subscribers receive services commensurate with their subscription plans and/or other requirements. Allocation of other resources within the MSO/MNO network based on the aforementioned user profiles may also be employed, such as, e.g., where packet routing algorithms are implemented in order to minimize latency within (at least) the MSO portion of the network.

Moreover, mobility optimization functions within the controller 310 take SAS allocations/changes, SON (self optimizing network) functions and policies, as well as priorities of different traffic types (voice/video/data, etc.) to/from MNO cores. Moreover, priorities of a given MNO and its users in the context of the CBRS operator (e.g., MSO), as well as the DPI analytics data generated by the DPI/analytics engine 413, are taken into account by the optimization functions of the controller. In one implementation, the optimization is a combination of two or more metrics, e.g. (i) maximization of the user/device density in the small cell network (i.e., user/devices per geographical area, or per eNB); (ii) maximization of data throughput in the network within the uplink and/or downlink(s) (iii) adherence to applicable service level agreement(s) (SLA(s)) for QoS for different critical services (e.g., conversation voice, audio/video streaming, or live video); and (iv) compliance with one or more service policies of MNO or MSO networks, which may include e.g., allocating resources to certain high-value users or services to comply with the SLA per the policy or policies.

As an aside, deep packet inspection (DPI, also known as complete packet inspection and information extraction) is a form of computer network packet filtering that examines portions of a digital data packet with regard to various criteria or attributes. For example, malware such as viruses, protocol non-compliance, and network intrusions can ostensibly be detected using DPI techniques, such as to decide whether the packet may continue further processing within the network, or should be routed to a different destination (such as for cleansing, collection of statistical information, etc.). See, e.g., co-owned U.S. patent application Ser. No. 15/043,361 filed Feb. 12, 2016, entitled "APPARATUS AND METHODS FOR MITIGATION OF NETWORK ATTACKS VIA DYNAMIC RE-ROUTING", and issued as U.S. Pat. No. 10,341,379 on Jul. 2, 2019, incorporated herein by reference in its entirety, wherein a backbone provider's ingress and egress peer routers which route traffic according to "path"-routed schemes can be leveraged in the context of mitigating network-based attacks; path-based routing can be manipulated in a manner that is not subject to the same network routing loop constraints as hop-based routing.

Multiple headers for IP packetized data exist; however, network equipment only needs to use the first of these (i.e., the IP header) for normal packet routing operations. Use of additional headers (such as those of underlying TCP or UDP protocols commonly used in conjunction with the IP network-layer protocol) is normally considered to be shallow packet inspection (aka "stateful" packet inspection), whereas further analysis is required for so-called DPI.

Exemplary techniques for performing such deep packet inspection (DPI) are described in, for example, U.S. Pat. No. 9,413,651 entitled "SELECTIVE DEEP PACKET INSPECTION," U.S. Pat. No. 9,166,891 entitled "POLICY-ENABLED DYNAMIC DEEP PACKET INSPECTION FOR TELECOMMUNICATIONS NETWORKS," and U.S. Pat. No. 8,189,465 entitled "DEEP PACKET INSPECTION POLICY ENFORCEMENT", each of the foregoing incorporated herein by reference in its entirety.

In another implementation, the DPI is used to enforce certain network service level metrics, such as voice mean opinion score (MOS), streaming video quality metrics, network load adherence, and/or support for emergency services.

As part of the provisioning process for prioritization of certain class(es) of users and/or services (voice, streaming audio/video, live streaming etc.), QoS characteristics and resource reservations on the MSO backhaul and CBRS RAN for one or more MNO user policies (e.g., QoS in CBRS LTE RAN and core based on different LTE QoS Class Identifiers and further refined based on agreements with different MNO partners) are created within the MSO policy servers/enforcers 455, which provide the created policies to the DPI/analytics engine 413 for enforcement as described subsequently herein. For instance, in the exemplary context of LTE, there are multiple different QCIs (1 through 9) which are used for operational support of different types of QoS depending on the type of bearer (see Tables 4 and 5 below):

TABLE 4

| LTE QoS | GBR | Non-GBR |
|---|---|---|
| QoS Class Identifier | Supported | Supported |
| Allocation and Retention Priority | Supported | Supported |
| Guaranteed Bit rate (GBR) | Supported | |
| Maximum Bit rate (MBR) | Supported | |

TABLE 4-continued

| LTE QoS | GBR | Non-GBR |
|---|---|---|
| APN Aggregate Maximum Bit rate | | Supported |
| UE Aggregate Maximum Bit rate | | Supported |

TABLE 5

| LTE QCI | Type | Priority | Packet Delay Budget | Packet Error Loss Rate | Typical Services |
|---|---|---|---|---|---|
| QCI-1 | GBR | 2 | 100 ms | $10^{-2}$ | Conversational voice |
| QCI-2 | | 4 | 150 ms | $10^{-3}$ | Live streaming of conversational voice |
| QCI-3 | | 3 | 50 ms | | Real time gaming |
| QCI-4 | | 5 | 300 ms | $10^{-6}$ | Video (buffered streaming) |
| QCI-5 | Non- | 1 | 100 ms | | IMS signaling |
| QCI-6 | GBR | 6 | 300 ms | | Video (buffered streaming), TCP based applications |
| QCI-7 | | 7 | 100 ms | $10^{-3}$ | Voice, video (live streaming), interactive gaming |
| QCI-8 | | 8 | 300 ms | $10^{-6}$ | Video (buffered streaming), TCP based applications |
| QCI-9 | | 9 | | | |

These policies can be user and/or service-specific, and may vary between different MNO partners for a given MSO/CBRS provider.

The DPI/analytics engine server 413 also in one embodiment, triggers one or more deep packet inspection processes to serve the roaming MNO users matching a specified QoS profile (e.g., a set of QoS characteristics which are complied within the CBRS RAN, backhaul, core and beyond, so as to maintain a certain level of user experience for a given service). The QoS profile can be derived from multiple sources, including for example the roaming subscriber's "home" MNO, the MVNO/MSO, a subscriber profile maintained by the MSO or MNO (e.g., high/low value user or subscription tier), application type/traffic bearer type, as well as insights from the DPI-based traffic analysis performed by the DPI/analytics engine(s), and can include for example both uplink (UL) and downlink (DL) throughput, allowable PER (packet error rate), jitter specifications, handover restrictions, idle mode exit policies (e.g., when the UE is dormant), and latency requirements.

Figures 4, 4A, 5:
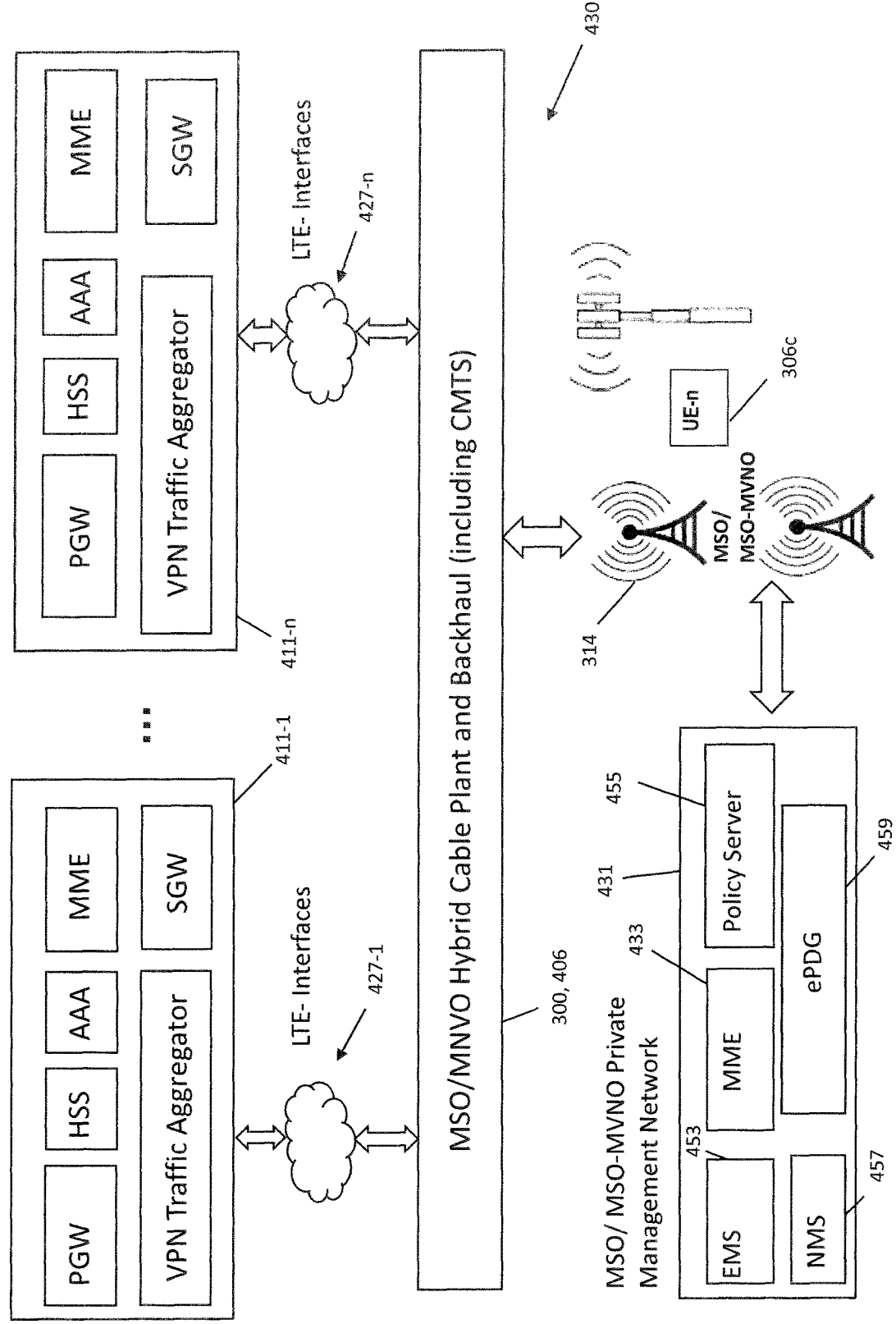

FIG. 4a-5 is a block diagram illustrating one embodiment of an MSO/MNO CBRS network Architecture configured for MNO subscriber roaming to the MSO network. As shown, the network architecture 430 includes the MNO core interfaces 427-1, 427-n (which may include for example interfaces from MNO core to the CBRS core such as eNodeB backhauls, SAS, back office provisioning data interfaces, billing and other OSS systems (BOSS)), which interface the respective MNO core(s) 411 with the MSO "back end" 300, 406 (e.g., the HFC and backbone portions of the MSO's plant). As shown (see also FIG. 4a), this MSO back end is also in communication with the service domains, specifically the CBSDs 314 via e.g., a DOCSIS or other service "drop" at the service location(s). Data is communicated from the CBSDs 314 in the MSO CBRS RAN to an MSO/MNVO private management network.

Within the MNO cores 411 are typical MNO 3GPP/LTE cellular core, entities/processes, including one or more VPN aggregators (for aggregating user data), serving gateways (SGWs), mobility manager entity (MME), MNO AAA server(s), packet/PDN gateways (PGWs), home subscriber servers (HSSs).

Within the MSO/MVNO network 431 of the MSO is a corresponding MME 433, policy server(s) 455, an eDPG (evolved data packet gateway, for internetworking between the 3GPP EPC (evolved packet core) and untrusted third party non-3GPP networks), Network Management System (NMS for configuring network settings, collection of statistics, etc.), and Element Management System (EMS—for network element management and data collection). The operation of the policy server(s) is described in greater detail below with respect to FIGS. 5-5b.

Figure 4B:
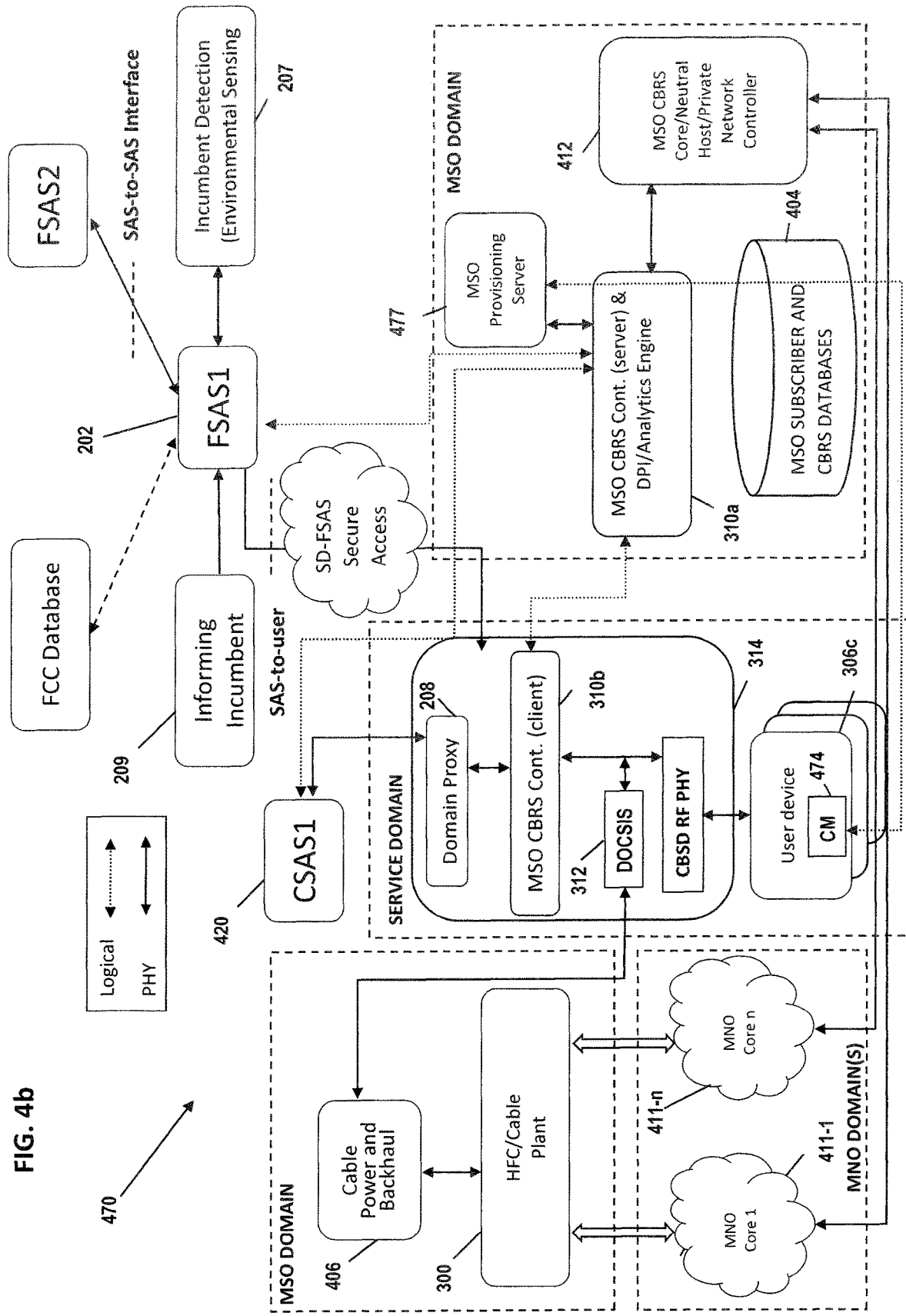
FIG. 4b is a functional block diagram of a second exemplary embodiment of a wireless network infrastructure including distributed controller functionality and client provisioning, useful with various aspects of the present disclosure.

Referring now to FIG. 4b, a second embodiment of a network architecture 430 useful in implementing the CBRS-based wireless RAT access and co-existence methods of the present disclosure. In this embodiment, a distributed architecture for the MSO controller 310 is utilized, and the domain proxy 208 is maintained by the MSO as part of the MSO connection manager "client" disposed at the venue or area of interest ("service domain"). Moreover, the DPI 413 and the MSO CBRS controller 310 are combined into a common device/function 310 within the MSO network domain.

In one implementation, the client devices 306c may each include a connection manager (CM) application computer program 474 operative to run on the client and, inter alia, enable the host client device to operate in a multi-RAT environment (e.g., WLAN, CBRS-LTE, and non-CBRS LTE). As an aside, downloadable application or "app" may be available to client devices of subscribers of an MSO or cable network (and/or the general public, including MSO "partner" MNO subscribers), where the app allows users to connect to or obtain MSO-provided services while roaming. Application program interfaces (APIs) may be included in an MSO-provided applications, installed with other proprietary software that comes prepackaged with the client device, or natively available on the CC or other controller apparatus. Such APIs may include common network protocols or programming languages configured to enable communication with other network entities as well as receipt and transmit signals that may be interpreted by a receiving device (e.g., client device). Alternatively, the relevant MNO may provide its subscribers with the aforementioned functionality (e.g., as a pre-loaded app on the UE at distribution, or later via download), or as a firmware update to the UE stack conducted OTA.

It will also be appreciated that the connection manager entity (whether as an individual component, or distributed across two or more platforms, such as via client and server portions disposed respectively) can be configured in one implementation to obtain data relating to one or more performance or desirability metrics associated with the available communication options, and conduct an evaluation based thereon, For example, a quality of service (QoS) related parameter such as BER/PER, and/or strength of signal (e.g., RSSI, RSRP. RSRQ) of each of (i) the MSO-provided CBRS service, and (ii) the MNO-provided cellular service, can be obtained. In one variant, the connection manager app running on a UE can utilize the LTE-based air interface to obtain signal measurements at the then-present location of the UE, so as to evaluate putative quality of each connection. The UE can, at the direction of the connection manager, cause autonomous selection of one air interface/RAN over the other based on the comparison. When the user selects the app function for e.g., automated selection, the UE will, in one variant, detect the availability of the CBRS RAN and LTE (cellular) RAN via signal strength measurements exceeding a prescribed minimum threshold, and implement selection of one or the other based on evaluation metrics. For instance, such metrics may be as simple as which has the higher relative (or even absolute, if relatable) signal strength at that location, or alternatively more complex (such as for example being based on other considerations such as available data bandwidth as signaled by the corresponding CBRS CBSD or eNB). In another implementation, the connection manager entity is disposed on an MSO network controller entity (i.e., a CBRS system controller, or even one or more CBSDs or eNBs), and configured to evaluate the CBRS and MNO cellular options at one or more locations within a prescribed CBRS coverage area (e.g., via use of the one or more CBSD base stations or eNBs). For example, in one variant, each of the MSO-operated CBSDs includes an RF front end tunable to the relevant frequency bands of interest (i.e., 3.5 GHz as well as prevailing cellular LTE bands in that broader geographic region), such as via a software-defined radio (SDR), so as to assess the signal characteristics at each respective location. The CBRS controller (e.g., 310/310a/310b of FIGS. 4 and 4b) can then generate a data structure (e.g., logic table or "heat map") indicating the relative quality, strength, or desirability of each frequency band (e.g., LTE cellular RAN versus CBRS RAN) at each location, and instruct the relevant UE(s) to utilize their client manager app to invoke selection of one RAN or other based thereon.

Methods—

Figure 6:
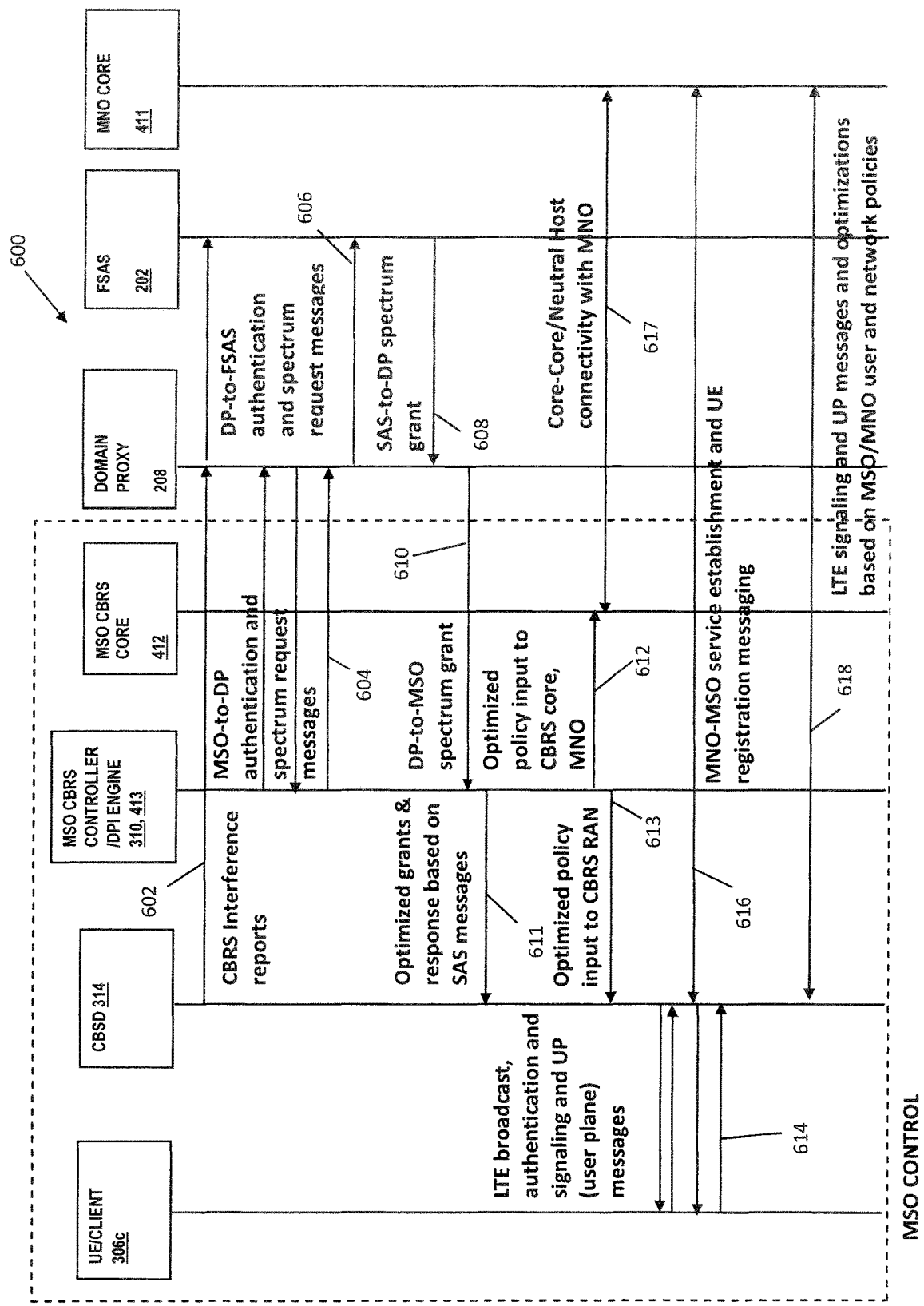
FIG. 6 is a ladder diagram illustrating a first embodiment of a communication flow for establishing quasi-licensed band communication for a roaming MNO user in accordance with the methods of the present disclosure.

Various methods and embodiments thereof for providing quasi-licensed (e.g., CBRS) spectrum access to roaming MNO subscribers according to the present disclosure are now described with respect to FIGS. 5-6.

FIG. 5 illustrates an exemplary embodiment of a method 500 implemented by the system architecture (e.g., the system 400 as discussed above with respect to FIG. 4a) to enable connectivity to a quasi-licensed wireless network (e.g., CBRS network) by a client device such as an LTE-enabled UE of a roaming MNO subscriber. The wireless network useful with method 500 is not limited to those embodied in FIGS. 3-4b herein, and may be used with any wireless-enabled client device and any architecture utilizing data communication among nodes (including those with multiple coexisting networks).

At step 502, the UE monitors the relevant portion of the quasi-licensed spectrum (e.g., the 3.500-3.770 GHz band) to perform energy detection in support of CBRS network entry. As discussed elsewhere herein, the UE may be configured to perform such scans indigenously by its home cellular network (e.g., EUTRAN), or via an app or other software firmware resident on the UE and supported by the MSO RAN/core. In the exemplary embodiment, the goal of network entry is to identify and synchronize one or more CBSDs 314 within the MSO network coverage area, and establish a communication session therewith. Accordingly, in the exemplary embodiments, indigenous LTE-TDD capability is used, since such capability can be readily utilized within a LTE-enabled UE. For instance, certain U.S. MNO LTE networks operating within the 2.5 GHz band utilize TDD, and the CBRS "LTE" networks operating within the 3.5 GHz CBRS band of the present disclosure are configured for only TDD operation. Hence, any LTE operator using the 3.5 GHz band per CBRS Alliance specifications will be an (LTE) TDD operator.

Moreover, use of TDD provides certain benefits with respect to unlicensed operation among multiple users (and hence by extension quasi-licensed operation such as within CBRS RANs).

Per step 504, the UE evaluates the monitoring data of the prescribed quasi-licensed spectrum to determine an energy level or establish "detection" of a CBSD of sufficient strength/proximity (e.g., based on RSSI or other value exceeding a prescribed threshold). This will determine if the UE is within the MSO coverage area; other techniques for detection of coverage may be used as well, consistent with the present disclosure. If the UE is not within coverage (e.g., no MSO CBSDs detected), monitoring continues according to a prescribed schedule of higher-layer logic.

Alternatively, if the CBSD 314 is detected, the UE attempts to synchronize with the CBSD (step 506) according to the prescribed protocol (e.g., establishing timing via hypothesis testing, reading broadcast channels such as PDCCH and decoding preambles and other data, per step 508) so as to enable the UE to at least transact its UE-specific data (e.g., IMSI) with the CBSD per step 510. The data is then passed to the MSO controller 310 (and core 412), and the UE data is accessed from the MNO (or if resident in the MSO database 404 or private network 431) so that the UE is authenticated to the MSO RAN and core (step 512). Once authenticated, it is provisioned within the CBRS RAN (e.g., as to TDD parameters such as slots, time-frequency resources, CBRS sub-bands, etc.) per step 514, and connected to its "home" MNO core 411 via the MSO core 412 and LTE interfaces 427 per step 516. As described in greater detail below, such connection may also include imposition or enforcement of one or more policies for the user data transacted by the UE, such as QoS requirements, prioritization based on MNO identity and/or type of traffic (e.g., voice, data, etc.).

Figure 5:
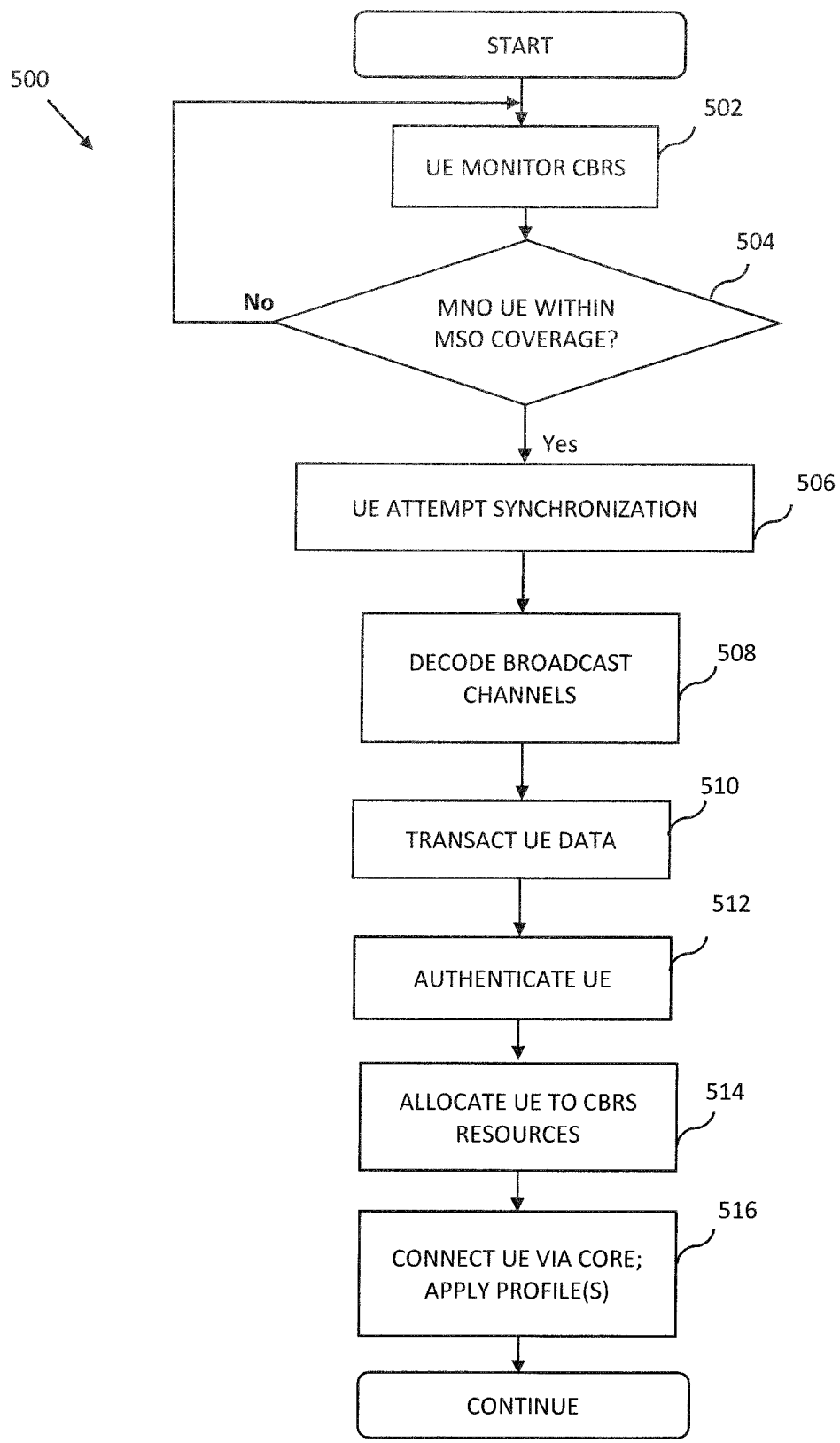
Figure 5A:
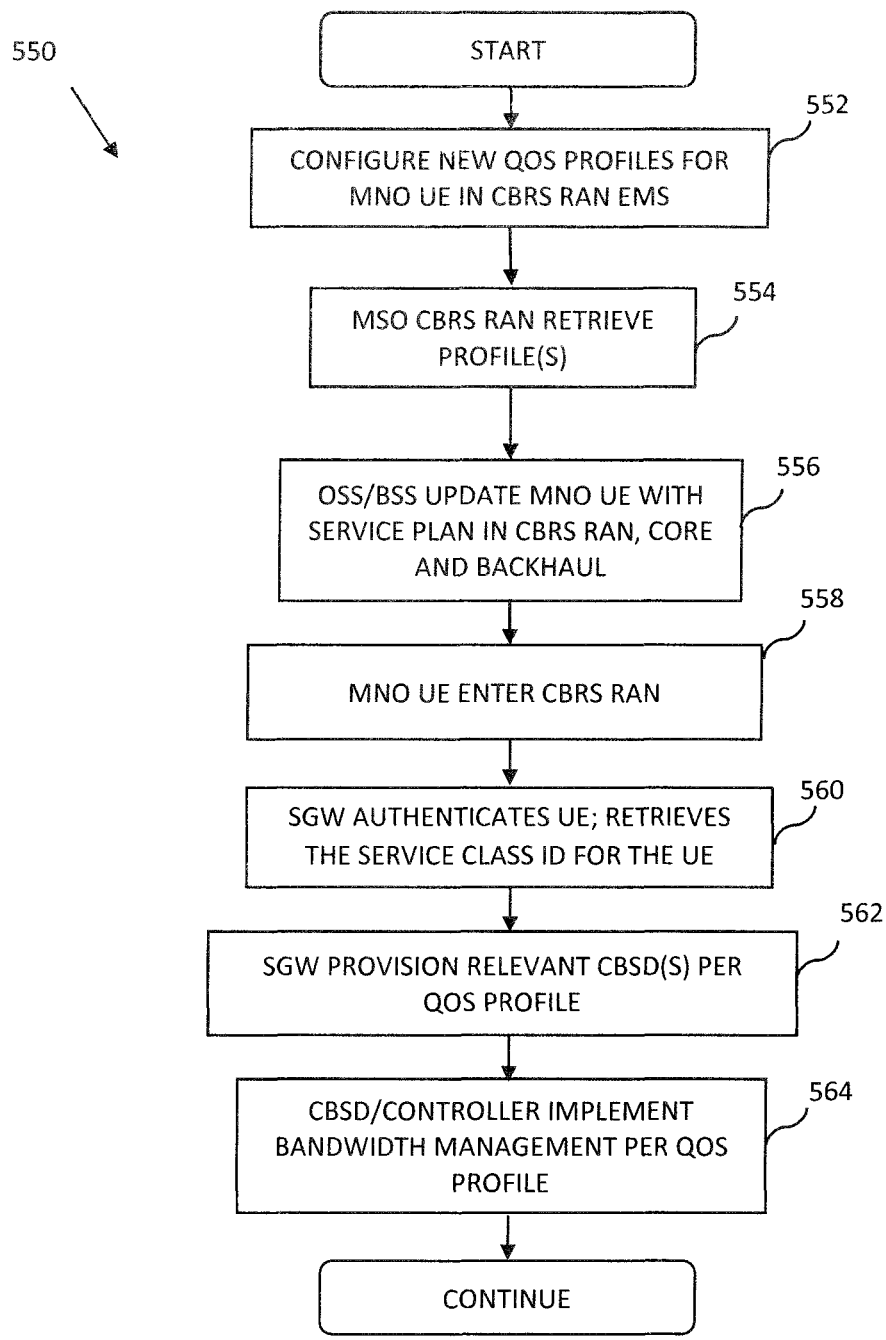
FIG. 5a is logical flow diagram of an exemplary implementation of a method for MSO CBRS system bandwidth management according to the present disclosure.

Referring now to FIG. 5a, one exemplary embodiment of an MSO CBRS system bandwidth management methodology is now described in detail.

As shown in FIG. 5a, the method 550 includes first configuring new QoS profiles for MNO roaming user devices (UEs) within the MSO CBRS RAN EMS 433 (e.g., located in the MSO/MNO AAA architecture) per step 552.

The MSO CBRS RAN controller SGW 434 then retrieves the QoS profile and the associated service class ID values (e.g., from one or more designated entities within the MSO and/or MNO cores) per step 554. For example, in one implementation, the QoS profiles are stored concurrently within the MSO subscriber and CBRS database 404 (FIG. 4a), such as where the MNO provides a list of its subscribers (and associated data) to the "partner" MSO such that the MSO can maintain that data for rapid access within the MSO network core or infrastructure (e.g., the partner MNO subscribers are "pseudo-subscribers" of the MSO, and maintained within the MSO subscriber database as such). In another implementation, the MNO maintains QoS profiles for its roaming subscribers, which are made accessible to the MSO CBRS controller logic when the subscribers roam and request CBRS service (or otherwise "enter" the CBRS coverage area and are recognized by the CBSD(s) and CBRS controller). Myriad other approaches will be recognized by those of ordinary skill given the present disclosure, the foregoing being merely exemplary.

Next, the BSS/OSS 454 updates the MNO user's device profile with the appropriate service plan per step 556. Depending on the location of the profile data (e.g., whether within MSO network, MNO network, or even UE itself), appropriate protocols and communications modalities are utilized to perform the update. In one implementation, the update is performed within the MSO's CBRS RAN, the MSO core, and backhaul portions of the MSO network.

Next, the roaming MNO UE performs network entry (such as via the procedure of FIGS. 5 and 6) into the MSO CBRS RAN per step 558. The CBRS RAN controller SGW 434 then authenticates the UE (see FIG. 5a), and retrieves the service class ID for the UE per step 560.

The SGW 434 then provides the relevant QoS parameters (based on the service class ID) to the relevant CBSD(s) 314 of the CBRS RAN per step 562.

The CBSD 314 (under direction of the controller 310) then performs bandwidth management and UE scheduling per the relevant QoS profile per step 564.

Figure 5B:
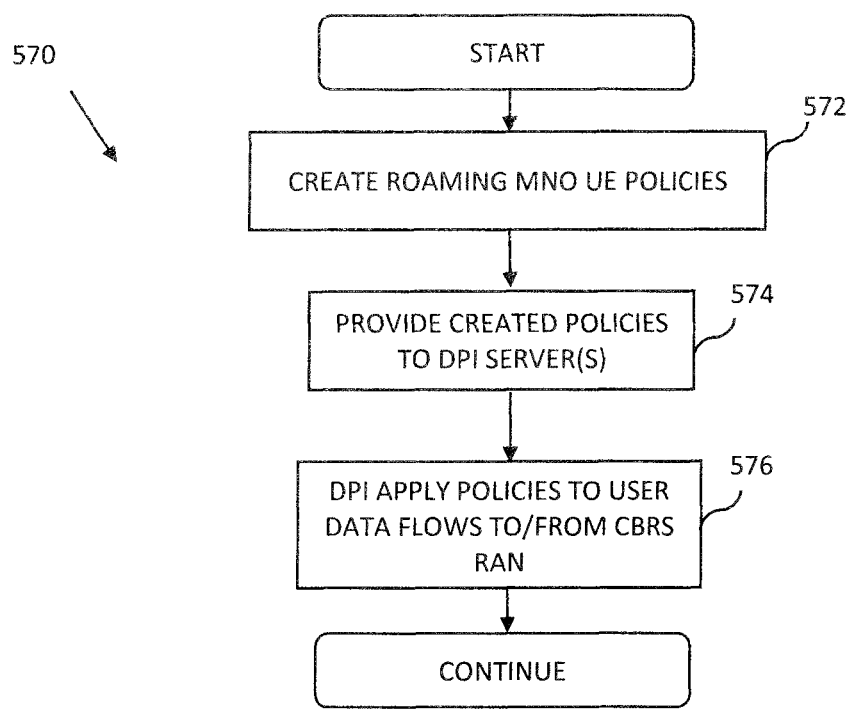
FIG. 5b is logical flow diagram of an exemplary implementation of a method for provisioning one or more UE data flows per MNO/MSO policies, according to the disclosure.

Referring now to FIG. 5b, one embodiment of a provisioning methodology according to the disclosure is described. As shown, the method 570 first creates one or more roaming MNO user policies within the policy server/enforcer 455 of the MSO network per step 572 (see FIG. 4a-5). As previously described, the user policies may be associated with a particular MNO roaming user device (e.g., a given UE, based on particular identifying data thereof), and stored within e.g., the MSO infrastructure (e.g., with a subscriber/pseudo-subscriber database).

Next, per step 574, the policy server/enforcer system 455 provides data descriptive of the policies to the DPI server 413, so as to enable the DPI processes to perform DPI on the user data flows to enforce the policies (step 576). For example, in one implementation, the policy server(s) 455 provide data indicative of a QoS policy to be applied to one or more MNO roaming users when within the MSO CBRS RAN, based on type of user data application (e.g., data, video, voice, etc.) and other attributes associated with the particular MNO roaming user and UE, as well as other attributes of the bearer(s) used to support the requested services.

FIG. 6 is a ladder diagram illustrating an exemplary communications flow 600 for configuring and controlling CBRS connectivity for one or more roaming MNO users within an area or venue.

At step 602 of the exemplary embodiment, a CBSD 314 sends an interference report to the designated DP 208. Data of these reports are forwarded to the cognizant FSAS(s) 202 by the DP 208 according to the proper FSAS protocol. The reports may contain information related to, e.g., transmit power of nearby access points and nodes, number of users, channels used, data transmission rates, beamforming settings, modulation/coding scheme (MCS), or other statistics associated with signals propagating within the venue, e.g., signals related to CBRS sub-bands in the 3.550-3.700 GHz range. Per step 604, the MSO controller 310 (here, with integrated DPI/analytics engine 413) decides it needs CBRS spectrum allocated (for whatever reason; e.g., in response to any number of scenarios such as those of FIGS. 5-5b discussed above), and invokes a communication protocol with the DP 208. Such protocol may include for example an authentication (e.g., challenge-response) of the MSO controller 310 by the DP, and conversely authentication of the DP 208 by the MSO controller 310 or its security proxy, so as to e.g., mitigate spoofing or MITM attacks.

Once the DP/controller are mutually authenticated, the DP 208 generates a spectrum request message on behalf of the controller 310 for transmission to the FSAS 202 per step 606. Per step 608, the FSAS 202 responds to the DP 208 with a spectrum grant (or rejection), which is then symmetrically sent to the MSO controller 310 per step 610 using the appropriate MSO/DP protocols (which may differ from those of the FSAS).

Per step 611, the MSO controller 310, after evaluating and conducting optimization of spectrum sub-band allocations to the various CBSDs within a given venue/area (and optionally other venues/areas, depending on coverage), issues its optimized allocations of the sub-bands to the CBSDs 314 of the one or more areas/venues. At this point, the CBSDs configure for operation in the allocated sub-bands (e.g., LTE band 43), and broadcast on their DL channels to advertise their availability to any client/UE within range of the CBSD(s).

Specifically, as is known, LTE systems utilize OFDM on their DL (base to UE), and SC-FDMA on their UL (UE to base), and further employ a number of shared/control channels for a variety of control, signaling, and other functions. These channels exist in both DL and UL directions, and include the: (i) physical downlink control channel (PDCCH); (ii) physical uplink control channel (PUCCH); (iii) physical downlink shared channel (PDSCH); and (iv) physical uplink shared channel (PUSCH). These channels can be decoded by the UE and used to establish communication with the CBSD 314.

Also, per steps 612 and 613, the MSO controller 310 will generate an optimized policy input to the CBRS core (and ultimately the relevant MNO), and the CBRS RAN (i.e., CBSD) based on the policy considerations including MNO user/network policies applicable to the roaming MNO subscriber, such as for bulk billing and provisioning operations, whether by the MSO or MNO.

In the exemplary embodiment, optimization functions within the MSO controller 310 takes into consideration network state, topology, load, and user requirements, and generate a standardized request to the SAS service based thereon. The optimization functions also "tune" the response from the SAS entity before sending it to the CBSD 314 and MNO Core 412 (see FIGS. 4a and 6). Mobility optimization takes SAS changes, SON functions, and policies, as well as priorities of different traffic types (voice/video/data, etc.) to/from MNO cores. Moreover, priorities of a given MNO and its users for the CBRS operator (e.g., MSO), as well as the DPI analytics data generated by the DPI/analytics engine 413, are taken into account by the optimization functions of the controller as well, as described in greater detail supra.

In operation, the LTE UE will report its CSI (channel state information, including CQI or channel quality index) via one of the UL channels; i.e., PUSCH or PUCCH, thereby characterizing the RF receiving environment for each reporting UE. The eNodeB takes the reported CSI information to develop a schedule for transmission to the UE(s) via the PDSCH, and DL resource allocation is made via the PDCCH. UL grants (for UE traffic operations such as when no PUSCH is available) are also made by the eNodeB via the PDCCH, based on requests sent via the PUCCH.

Hence, per step 614, the UE(s) receive the broadcast channels, synchronize and determine timing (e.g., via CAZAC sequence analysis), and then establish UL communication with the CBSD (operating effectively as an eNodeB) within the sub-bands of interest, including authentication and sign-on of the UE to the MNO network. The latter is facilitated in one implementation via one or more service establishment requests to the MNO's designated EUTRAN entity per step 616; e.g., to validate the UE's mobile ID and other subscription information, and enabling transaction of UP (user plane) data between the client device and the eNodeB. In this implementation, the MSO infrastructure acts effectively as a conduit or extension of the MNO network, with the MNO core 411 conducing all of the relevant communications operations to establish the UE/eNB session per the LTE standards, with the CBSD(s) 314 acting as its proxy within the MSO network.

Per step 617, MSO core-to-MNO core user data connectivity is established such that the CBRS-serviced call data (e.g., user data such as voice data or video data) can be transacted between the MSO core and MNO core using a high-capacity backhaul (e.g., for at least a portion of the MSO network, a DOCSIS 3.0 or 3.1 backhaul from the CBSD(s) 314 is used, and the data forwarded via the MSO core (e.g., backbone thereof) to the MNO network using for example extant network transport protocols such as TCP/UDP.

Per step 618, the CBSD, the session is optionally configured according to one or more MSO policies as dictated by the controller 310 (and indirectly by the partner MNOs); i.e., according to e.g., previously agreed-upon policies between the MSO and MNO 411, and these policies for the particular session are then communicated to the MNO. See discussion of FIGS. 5-5b presented elsewhere herein.

CBRS Controller Apparatus—

Figure 7:
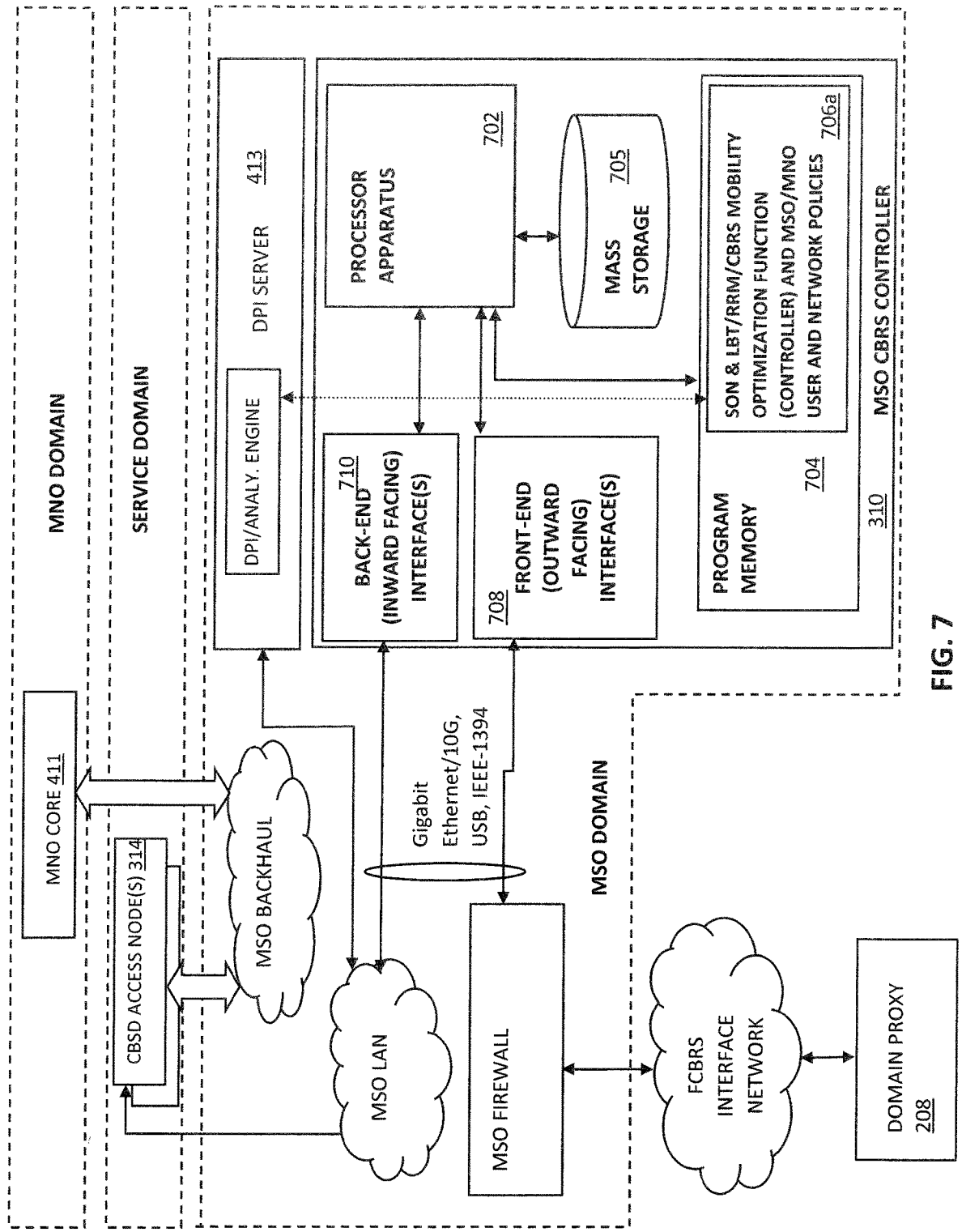
FIG. 7 is a functional block diagram illustrating a first exemplary embodiment of an MSO CBRS controller apparatus useful with various embodiments of the present disclosure.

FIG. 7 illustrates a block diagram of exemplary hardware and architecture of a controller apparatus, e.g., the CBRS controller 310 of FIG. 4a, useful for operation in accordance with the present disclosure.

In one exemplary embodiment as shown, the controller 310 includes, inter alia, a processor apparatus or subsystem 702, a program memory module 704, a connectivity manager module 706a (here implemented as software or firmware operative to execute on the processor 702), a back-end (inward-facing) network interface 710 for internal MSO communications and control data communication with the relevant CBSD(s) 314 and the DPI Server 413, and a front-end or outward-facing network interface 708 for communication with the DP 208 (and ultimately the FSAS 202 via a Federal secure interface network, or CSAS 420) via an MSO-maintained firewall or other security architecture. Since CBRS controllers could feasibly be employed for surreptitious activity, each should be secure from, inter alia, intrusive attacks or other such events originating from the public Internet/ISP network 311 (FIG. 3a) or other sources.

Accordingly, in one exemplary embodiment, the controllers 310 are each configured to utilize a non-public IP address within a CBRS "DMZ" of the MSO network. As a brief aside, so-called DMZs (demilitarized zones) within a network are physical or logical sub-networks that separate an internal LAN, WAN, PAN, or other such network from other untrusted networks, usually the Internet. External-facing servers, resources and services are disposed within the DMZ so they are accessible from the Internet (and hence e.g., DPs 208 responding to MSO-initiated CBRS spectrum allocation requests), but the rest of the internal MSO infrastructure remains unreachable or partitioned. This provides an additional layer of security to the internal infrastructure, as it restricts the ability of surreptitious entities or processes to directly access internal MSO servers and data via the untrusted network, such as via a DP "spoof" or MI™ attack.

In addition, the controller 310 of the exemplary implementation is configured to only respond to a restricted set of protocol functions; i.e., authentication challenges from a valid DP 208 or SAS 202 (i.e., those on a "white list" maintained by the MSO), requests for interference monitoring data from a DP or SAS, resource allocation ACKs, etc.

Although the exemplary controller 310 may be used as described within the present disclosure, those of ordinary skill in the related arts will readily appreciate, given the present disclosure, that the controller apparatus may be virtualized and/or distributed within other network or service domain entities (as in the distributed controller architecture of FIG. 4b), and hence the foregoing apparatus 310 is purely illustrative.

More particularly, the exemplary controller apparatus 310 can be physically located near or within the centralized operator network (e.g., MSO network); within or co-located with a CBSD (as in the embodiment of FIG. 4b); within an intermediate entity, e.g., within a data center, such as a WLAN AP controller (see FIG. 4c); and/or within "cloud" entities or other portions of the infrastructure of which the rest of the wireless network (as discussed supra) is a part, whether owned/operated by the MSO or otherwise. In some embodiments, the CBRS controller 310 may be one of several controllers, each having equivalent effectiveness or different levels of use, e.g., within a hierarchy (e.g., the controller 310 may be under a "parent" controller that manages multiple slave or subordinate controllers, with each of the "slaves" for example being designated to control functions within their own respective venue(s)).

In one embodiment, the processor apparatus 702 may include one or more of a digital signal processor, microprocessor, field-programmable gate array, or plurality of processing components mounted on one or more substrates. The processor apparatus 702 may also comprise an internal cache memory. The processing subsystem is in communication with a program memory module or subsystem 704, where the latter may include memory which may comprise, e.g., SRAM, flash and/or SDRAM components. The memory module 704 may implement one or more of direct memory access (DMA) type hardware, so as to facilitate data accesses as is well known in the art. The memory module of the exemplary embodiment contains one or more computer-executable instructions that are executable by the processor apparatus 702. A mass storage device (e.g., HDD or SSD, or even NAND flash or the like) is also provided as shown.

The processor apparatus 702 is configured to execute at least one computer program stored in memory 704 (e.g., the logic of the CBRS controller in the form of software or firmware that implements the various controller functions described herein with respect to CBRS spectrum allocation, CBSD environmental monitoring, etc.). Other embodiments may implement such functionality within dedicated hardware, logic, and/or specialized co-processors (not shown).

In one embodiment, the mobility optimization manager 706a is further configured to register known downstream devices (e.g., access nodes including CBSDs and WLAN APs), other backend devices, and wireless client devices (remotely located or otherwise), and centrally control the broader wireless network (and any constituent peer-to-peer sub-networks). Such configuration include, e.g., providing network identification (e.g., to CBSDs, APs, client devices such as roaming MNO UEs, and other devices, or to upstream devices), identifying network congestion, Self Optimization (SO) functions, and managing capabilities supported by the wireless network.

Moreover, as described previously herein, MSO and MNO network and user policies may implemented using the controller logic 706a. In one implementation, one or more primary factors is/are used as a basis to structure the optimization to maximize or optimize the primary factor(s). For example, if the goal at given instance is to push a larger amount of data (i.e., throughput) such as in the downlink direction (DL), the UEs or devices with better signaling may be chosen by the optimization logic to transact more data in an efficient manner (effectively "path of least resistance" logic). This can also be applied to for instance a higher subscriber service tier vs. a lower subscriber tier; the higher tier may be allocated available bandwidth (at least to a prescribed degree or value) before bandwidth is allocated to the lower tier, so as to ensure the user experience for the higher tier is sufficient. Alternatively, the goal may be more equitable distribution of resources (i.e., radio/backhaul/core resources) among different users, access networks, partners and/or different types of services (e.g., voice versus data, QoS versus non-QoS, etc.), logic to balance the resources across the different user, etc. may be employed. See, e.g., U.S. Pat. No. 9,730,143 to Gormley, et al. issued Aug. 8, 2017 and entitled "Method and apparatus for self organizing networks;" U.S. Pat. No. 9,591,491 to Tapia issued Mar. 7, 2017 entitled "Self-organizing wireless backhaul among cellular access points;" and U.S. Pat. No. 9,730,135 to Rahman issued Aug. 8, 2017, entitled "Radio access network resource configuration for groups of mobile devices," each of the foregoing incorporated herein by reference in its entirety, for exemplary SON implementations useful with various aspects of the present disclosure.

In the exemplary embodiment, optimization functions within the MSO controller 310 takes into consideration network state, topology, load, and user requirements, and generate a standardized request to the SAS service based thereon. The optimization functions also "tune" the response from the SAS entity before sending it to the CBSD 314 and MNO Core 412 (see FIGS. 4a and 6). Mobility optimization takes SAS changes, SON functions, and policies, as well as priorities of different traffic types (voice/video/data, etc.) to/from MNO cores. Moreover, priorities of a given MNO and its users for the CBRS operator (e.g., MSO), as well as the DPI analytics data generated by the DPI/analytics engine 413, are taken into account by the optimization functions of the controller as well, as previously described herein.

In one embodiment, the mobility optimization manager 706a accesses the mass storage 705 (or the CBRS DB 404) to retrieve stored data. The data or information may relate to reports or configuration files as noted above. Such reports or files may be accessible by the mobility optimization manager 706a and/or processor 702, as well as other network entities, e.g., a CM 444 provisioning server 417 (FIG. 4b) or wireless nodes (CBSDs 314a or APs 314b).

In other embodiments, application program interfaces (APIs) such as those included in an MSO-provided applications, installed with other proprietary software, or natively available on the controller apparatus (e.g., as part of the computer program noted supra or exclusively internal to the mobility optimization manager 706a) may also reside in the internal cache or other memory 704. Such APIs may include common network protocols or programming languages configured to enable communication with other network entities as well as receipt and transmit signals that a receiving device (e.g., CBSD, WLAN AP, client device) may interpret.

The mobility optimization manager 706 may further be configured to directly or indirectly communicate with one or more authentication, authorization, and accounting (AAA) servers 450 of the network (see FIG. 4a-4). The AAA servers are configured to provide services for, e.g., authorization and/or control of network subscribers (including roaming MNO "visitors") for controlling access and enforcing policies related thereto with respect to computer resources, enforcing policies, auditing usage, and providing the information necessary to bill for services.

In some variants, authentication processes are configured to identify a CBSD 314 or an AP 314b, a client device 306c, or an end user, such as by having the client device identify or end user enter valid credentials (e.g., user name and password, or Globally Unique Identifier (GUID)) before network access or other services provided by the operator may be granted to the client device and its user (see discussion of FIGS. 5-5b and 6 above). Following authentication, the AAA servers may grant authorization to a roaming MNO subscriber for certain MSO-provided features, functions, and/or tasks, including access to MSO-provided cloud storage, streaming content, billing information, exclusive media content, etc. Authentication processes may be configured to identify or estimate which of the known CBSDs 314a serviced by the CBRS controller 310 tend to serve roaming MNO subscribers, thereby providing additional insights with respect to how a particular CBSD may be treated. For example, if a first CBSD serves many MNO subscribers relative to another CBSD or AP, the controller 310 may favor the first CBSD by, e.g., allocating CBRS sub-bands preferentially or in greater number/bandwidth or other "preferences", resulting in a better or additional end-user experiences for the users (ostensibly many roaming MNO subscribers) using that first CBSD.

Returning to the exemplary embodiment as shown in FIG. 7, one or more network "front-end" or outward-facing interfaces 708 are utilized in the illustrated embodiment for communication with external (non-MSO) network entities, e.g., DPs 208, via, e.g., Ethernet or other wired and/or wireless data network protocols.

In the exemplary embodiment, one or more backend interfaces 710 are configured to transact one or more network address packets with other MSO networked devices, particularly backend apparatus such as the MSO-operated CBSDs 314a and WLAN APs 314b (FIG. 7b) within the target venue/area. Other MSO entities such as the MSO CMTS, Layer 3 switch, network monitoring center, AAA server, etc. may also be in communication with the controller 310 according to a network protocol. Common examples of network routing protocols include for example: Internet Protocol (IP), Internetwork Packet Exchange (IPX), and Open Systems Interconnection (OSI) based network technologies (e.g., Asynchronous Transfer Mode (ATM), Synchronous Optical Networking (SONET), Synchronous Digital Hierarchy (SDH), Frame Relay). In one embodiment, the backend network interface(s) 710 operate(s) in signal communication with the backbone of the content delivery network (CDN), such as that of FIGS. 3-4c. These interfaces might comprise, for instance, GbE (Gigabit Ethernet) or other interfaces of suitable bandwidth capability.

It will also be appreciated that the two interfaces 708, 710 may be aggregated together and/or shared with other extant data interfaces, such as in cases where a controller function is virtualized within another component, such as an MSO network server performing that function.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. This description is in no way meant to be limiting, but rather should be taken as illustrative of the general principles of the disclosure. The scope of the disclosure should be determined with reference to the claims.

It will be further appreciated that while certain steps and aspects of the various methods and apparatus described herein may be performed by a human being, the disclosed aspects and individual methods and apparatus are generally computerized/computer-implemented. Computerized apparatus and methods are necessary to fully implement these aspects for any number of reasons including, without limitation, commercial viability, practicality, and even feasibility (i.e., certain steps/processes simply cannot be performed by a human being in any viable fashion).

APPENDIX I

LTE frequency bands - TS 36.101 (Rel. 14 Jun. 2017)

| Band | Name | Downlink (MHz) Low | Middle EARFCN[1] | High | Bandwidth DL/UL (MHz) | Uplink (MHz) Low | Middle EARFCN | High | Duplex spacing (MHz) | Equivalent UMTS band |
|---|---|---|---|---|---|---|---|---|---|---|
| 1 | 2100 | 2110 0 | 2140 300 | 2170 599 | 60 | 1920 18000 | 1950 18300 | 1980 18599 | 190 | 1 |
| 2 | 1900 PCS | 1930 600 | 1960 900 | 1990 1199 | 60 | 1850 18600 | 1880 18900 | 1910 19199 | 80 | 2 |
| 3 | 1800+ | 1805 1200 | 1842.5 1575 | 1880 1949 | 75 | 1710 19200 | 1747.5 19575 | 1785 19949 | 95 | 3 |
| 4 | AWS-1 | 2110 1950 | 2132.5 2175 | 2155 2399 | 45 | 1710 19950 | 1732.5 20175 | 1755 20399 | 400 | 4 |
| 5 | 850 | 869 2400 | 881.5 2525 | 894 2649 | 25 | 824 20400 | 836.5 20525 | 849 20649 | 45 | 5 |
| 6 | UMTS only | 875 2650 | 880 2700 | 885 2749 | 10 | 830 20650 | 835 20700 | 840 20749 | 45 | 6 |
| 7 | 2600 | 2620 2750 | 2655 3100 | 2690 3449 | 70 | 2500 20750 | 2535 21100 | 2570 21449 | 120 | 7 |
| 8 | 900 GSM | 925 3450 | 942.5 3625 | 960 3799 | 35 | 880 21450 | 897.5 21625 | 915 21799 | 45 | 8 |
| 9 | 1800 | 1844.9 3800 | 1862.4 3975 | 1879.9 4149 | 35 | 1749.9 21800 | 1767.4 21975 | 1784.9 22149 | 95 | 9 |
| 10 | AWS-1+ | 2110 4150 | 2140 4450 | 2170 4749 | 60 | 1710 22150 | 1740 22450 | 1770 22749 | 400 | 10 |
| 11 | 1500 Lower | 1475.9 4750 | 1485.9 4850 | 1495.9 4949 | 20 | 1427.9 22750 | 1437.9 22850 | 1447.9 22949 | 48 | 11 |
| 12 | 700 a | 729 5010 | 737.5 5095 | 746 5179 | 17 | 699 23010 | 707.5 23095 | 716 23179 | 30 | 12 |

APPENDIX I-continued

LTE frequency bands - TS 36.101 (Rel. 14 Jun. 2017)

| Band | Name | Downlink (MHz) Low | Middle EARFCN[1] | High | Bandwidth DL/UL (MHz) | Uplink (MHz) Low | Middle EARFCN | High | Duplex spacing (MHz) | Equivalent UMTS band |
|---|---|---|---|---|---|---|---|---|---|---|
| 13 | 700 c | 746 | 751 | 756 | 10 | 777 | 782 | 787 | −31 | 13 |
|  |  | 5180 | 5230 | 5279 |  | 23180 | 23230 | 23279 |  |  |
| 14 | 700 PS | 758 | 763 | 768 | 10 | 788 | 793 | 798 | −30 | 14 |
|  |  | 5280 | 5330 | 5379 |  | 23280 | 23330 | 23379 |  |  |
| 17 | 700 b | 734 | 740 | 746 | 12 | 704 | 710 | 716 | 30 |  |
|  |  | 5730 | 5790 | 5849 |  | 23730 | 23790 | 23849 |  |  |
| 18 | 800 Lower | 860 | 867.5 | 875 | 15 | 815 | 822.5 | 830 | 45 |  |
|  |  | 5850 | 5925 | 5999 |  | 23850 | 23925 | 23999 |  |  |
| 19 | 800 Upper | 875 | 882.5 | 890 | 15 | 830 | 837.5 | 845 | 45 | 19 |
|  |  | 6000 | 6075 | 6149 |  | 24000 | 24075 | 24149 |  |  |
| 20 | 800 DD | 791 | 806 | 821 | 30 | 832 | 847 | 862 | −41 | 20 |
|  |  | 6150 | 6300 | 6449 |  | 24150 | 24300 | 24449 |  |  |
| 21 | 1500 Upper | 1495.9 | 1503.4 | 1510.9 | 15 | 1447.9 | 1455.4 | 1462.9 | 48 | 21 |
|  |  | 6450 | 6525 | 6599 |  | 24450 | 24525 | 24599 |  |  |
| 22 | 3500 | 3510 | 3550 | 3590 | 80 | 3410 | 3450 | 3490 | 100 | 22 |
|  |  | 6600 | 7000 | 7399 |  | 24600 | 25000 | 25399 |  |  |
| 23 | 2000 S-band | 2180 | 2190 | 2200 | 20 | 2000 | 2010 | 2020 | 180 |  |
|  |  | 7500 | 7600 | 7699 |  | 25500 | 25600 | 25699 |  |  |
| 24 | 1600 L-band | 1525 | 1542 | 1559 | 34 | 1626.5 | 1643.5 | 1660.5 | −101.5 |  |
|  |  | 7700 | 7870 | 8039 |  | 25700 | 25870 | 26039 |  |  |
| 25 | 1900+ | 1930 | 1962.5 | 1995 | 65 | 1850 | 1882.5 | 1915 | 80 | 25 |
|  |  | 8040 | 8365 | 8689 |  | 26040 | 26365 | 26689 |  |  |
| 26 | 850+ | 859 | 876.5 | 894 | 35 | 814 | 831.5 | 849 | 45 | 26 |
|  |  | 8690 | 8865 | 9039 |  | 26690 | 26865 | 27039 |  |  |
| 27 | 800 SMR | 852 | 860.5 | 869 | 17 | 807 | 815.5 | 824 | 45 |  |
|  |  | 9040 | 9125 | 9209 |  | 27040 | 27125 | 27209 |  |  |
| 28 | 700 APT | 758 | 780.5 | 803 | 45 | 703 | 725.5 | 748 | 55 |  |
|  |  | 9210 | 9435 | 9659 |  | 27210 | 27435 | 27659 |  |  |
| 29 | 700 d | 717 | 722.5 | 728 | 11 |  | Downlink only |  |  |  |
|  |  | 9660 | 9715 | 9769 |  |  |  |  |  |  |
| 30 | 2300 WCS | 2350 | 2355 | 2360 | 10 | 2305 | 2310 | 2315 | 45 |  |
|  |  | 9770 | 9820 | 9869 |  | 27660 | 27710 | 27759 |  |  |
| 31 | 450 | 462.5 | 465 | 467.5 | 5 | 452.5 | 455 | 457.5 | 10 |  |
|  |  | 9870 | 9895 | 9919 |  | 27760 | 27785 | 27809 |  |  |
| 32 | 1500 L-band | 1452 | 1474 | 1496 | 44 |  | Downlink only |  |  | 32 |
|  |  | 9920 | 10140 | 10359 |  |  |  |  |  |  |
| 65 | 2100+ | 2110 | 2155 | 2200 | 90 | 1920 | 1965 | 2010 | 190 |  |
|  |  | 65536 | 65986 | 66435 |  | 131072 | 131522 | 131971 |  |  |
| 66 | AWS-3 | 2110 | 2155 | 2200 | 90/70 | 1710 | 1745 | 1780 | 400 |  |
|  |  | 66436 | 66886 | 67335 |  | 131972 | 132322 | 132671 |  |  |
| 67 | 700 EU | 738 | 748 | 758 | 20 |  | Downlink only |  |  |  |
|  |  | 67336 | 67436 | 67535 |  |  |  |  |  |  |
| 68 | 700 ME | 753 | 768 | 783 | 30 | 698 | 713 | 728 | 55 |  |
|  |  | 67536 | 67686 | 67835 |  | 132672 | 132822 | 132971 |  |  |
| 69 | 2500 | 2570 | 2595 | 2620 | 50 |  | Downlink only |  |  |  |
|  |  | 67836 | 68086 | 68335 |  |  |  |  |  |  |
| 70 | AWS-4 | 1995 | 2007.5 | 2020 | 25/15 | 1695 | 1702.5 | 1710 | 300 |  |
|  |  | 68336 | 68461 | 68585 |  | 132972 | 133047 | 133121 |  |  |
| 252 | Unlicensed NII-1 | 5150 | 5200 | 5250 | 100 |  | Downlink only |  |  |  |
|  |  | 255144 | 255644 | 256143 |  |  |  |  |  |  |
| 255 | Unlicensed NII-3 | 5725 | 5787.5 | 5850 | 125 |  | Downlink only |  |  |  |
|  |  | 260894 | 261519 | 262143 |  |  |  |  |  |  |
| TDD |  |  |  |  |  |  |  |  |  |  |
| 33 | TD 1900 | 1900 | 1910 | 1920 | 20 |  |  |  |  | A(lo) |
|  |  | 36000 | 36100 | 36199 |  |  |  |  |  |  |
| 34 | TD 2000 | 2010 | 2017.5 | 2025 | 15 |  |  |  |  | A(hi) |
|  |  | 36200 | 36275 | 36349 |  |  |  |  |  |  |
| 35 | TD PCS Lower | 1850 | 1880 | 1910 | 60 |  |  |  |  | B(lo) |
|  |  | 36350 | 36650 | 36949 |  |  |  |  |  |  |
| 36 | TD PCS Upper | 1930 | 1960 | 1990 | 60 |  |  |  |  | B(hi) |
|  |  | 36950 | 37250 | 37549 |  |  |  |  |  |  |
| 37 | TD PCS Center gap | 1910 | 1920 | 1930 | 20 |  |  |  |  | C |
|  |  | 37550 | 37650 | 37749 |  |  |  |  |  |  |
| 38 | TD 2600 | 2570 | 2595 | 2620 | 50 |  |  |  |  | D |
|  |  | 37750 | 38000 | 38249 |  |  |  |  |  |  |
| 39 | TD 1900+ | 1880 | 1900 | 1920 | 40 |  |  |  |  | F |
|  |  | 38250 | 38450 | 38649 |  |  |  |  |  |  |
| 40 | TD 2300 | 2300 | 2350 | 2400 | 100 |  |  |  |  | E |
|  |  | 38650 | 39150 | 39649 |  |  |  |  |  |  |
| 41 | TD 2500 | 2496 | 2593 | 2690 | 194 |  |  |  |  |  |
|  |  | 39650 | 40620 | 41589 |  |  |  |  |  |  |

APPENDIX I-continued

LTE frequency bands - TS 36.101 (Rel. 14 Jun. 2017)

| Band | Name | Downlink (MHz) Low | Middle EARFCN[1] | High | Bandwidth DL/UL (MHz) | Uplink (MHz) Low | Middle EARFCN | High | Duplex spacing (MHz) | Equivalent UMTS band |
|---|---|---|---|---|---|---|---|---|---|---|
| 42 | TD 3500 | 3400 41590 | 3500 42590 | 3600 43589 | 200 | | | | | |
| 43 | TD 3700 | 3600 43590 | 3700 44590 | 3800 45589 | 200 | | | | | |
| 44 | TD 700 | 703 45590 | 753 46090 | 803 46589 | 100 | | | | | |
| 45 | TD 1500 | 1447 46590 | 1457 46690 | 1467 46789 | 20 | | | | | |
| 46 | TD Unlicensed | 5150 46790 | 5537.5 50665 | 5925 54539 | 775 | | | | | |
| 47 | TD V2X | 5855 54540 | 5890 54890 | 5925 55239 | 70 | | | | | |
| 48 | TD 3600 | 3550 55240 | 3625 55990 | 3700 56739 | 150 | | | | | |

[1]EUTRA Absolute RF Channel Number

What is claimed is:

1. A computerized method for providing wireless service within a first network to a computerized client device served by a second network, the computerized method comprising:
    transmitting one or more spectrum requests to a spectrum allocation authority;
    obtaining data representative of a response from the spectrum allocation authority, the response comprising at least indicating an allocation of spectrum resources for one or more periods of time;
    optimizing the response, the optimizing based at least in part on analysis of at least a portion of the second network;
    based at least on the optimizing, selecting at least one quasi-licensed band for use by the computerized client device;
    allocating the selected at least one quasi-licensed band for use by at least the computerized client device;
    communicating data to one or more computerized entities of the second network, the communicated data enabling the computerized client device to utilize the selected at least one quasi-licensed band; and
    establishing communication with the computerized client device using the at least one quasi-licensed band via one or more access points of the first network.

2. The computerized method of claim 1, wherein the optimizing the response comprises:
    detecting undesired frequency bands within the spectrum resources allocated by the spectrum allocation authority; and
    removing the undesired frequency bands from being indicated by the data representative of the response.

3. The computerized method of claim 1, wherein the analysis comprises analyzing a number of users served by individual access nodes of the second network; and
    wherein the optimizing the response comprises adjusting a transmission power of one or more of the individual access nodes of the second network.

4. The computerized method of claim 3, wherein the adjusting the transmission power of one or more of the individual access nodes of the second network comprises at least one of (i) determining an amount of traffic carried, or (ii) determining a number of user devices served, by each of the one or more of individual access nodes.

5. The computerized method of claim 1, wherein the performing the analysis comprises correlating at least one quality of service (QoS) requirement to a subscriber profile associated with the computerized client device.

6. The computerized method of claim 5, wherein the correlating the at least one QoS requirement to the subscriber profile comprises determining at least one of an uplink throughput or downlink throughput within the second network associated with the subscriber profile.

7. The computerized method of claim 1, wherein the performing the analysis comprises generating deep packet inspection (DPI) analytics data.

8. The computerized method of claim 1, wherein the analysis comprises at least determining an amount of disruption to a core of the second network.

9. The computerized method of claim 1, wherein the analysis comprises correlating one or more resource allocation requirements to a subscriber profile associated with the computerized client device.

10. The computerized method of claim 9, wherein the correlating the one or more resource allocation requirements comprises implementing one or more packet routing algorithms to minimize latency within at least portions of the second network.

11. The computerized method of claim 1, wherein the analysis comprises analyzing at least a number of users served by the second network within a prescribed geographical area.

12. The computerized method of claim 1, wherein the analysis comprises determining one or more service policies of a subscriber profile associated with the computerized client device.

13. A computerized client device configured for use within at least first and second wireless access network infrastructures, the computerized client device comprising:
    at least one radio frequency (RF) interface configured to operate according to at least one air interface protocol;
    a digital processor apparatus in data communication with the at least one radio frequency interface; and
    a storage apparatus in data communication with the digital processor apparatus, the storage apparatus comprising a computer program configured to, when executed on the digital processor apparatus, implement wireless connection management logic of the computerized client device to:

obtain data relating to at least one performance metric associated with an access point apparatus of the first wireless access network, the first wireless access network configured to cause allocation of quasi-licensed RF spectrum;

based on the data relating to at least one performance metric, establish data communication with the access point apparatus, the data communication configured to enable the computerized client device to transmit data specific to the computerized client device to a computerized network apparatus of the first wireless access network, wherein the data specific to the computerized client device is utilized by the computerized network apparatus of the first wireless access network for authentication of the computerized client device; and receive network resources via use of (i) the access point apparatus, (ii) the at least one radio frequency interface, and (iii) at least a portion of the allocation of the quasi-licensed RF spectrum from the first wireless access network, the receipt of the network resources based on the authentication of the computerized client device;

wherein the computerized client device is associated with a subscriber of the second wireless access network infrastructure.

14. The computerized client device of claim 13, wherein the receipt of the network resources comprises enforcement of at least one service policy associated with the second wireless network infrastructure.

15. The computerized client device of claim 14, wherein the enforcement of the at least one service policy associated with the second wireless network infrastructure comprises compliance with a QoS (quality of service) policy.

16. The computerized client device of claim 14, wherein the enforcement of the at least one service policy associated with the second wireless network infrastructure comprises prioritization of a first type of data transacted by the access point apparatus over a second type of data transacted by the access point apparatus.

17. The computerized client device of claim 14, wherein the enforcement of the at least one service policy associated with the second wireless network infrastructure comprises prioritization of data originating from the second wireless network infrastructure over data originating from other wireless network infrastructures.

18. Computer readable apparatus comprising a non-transitory storage medium, the non-transitory storage medium comprising at least one computer program having a plurality of instructions, the plurality of instructions configured to, when executed on a processing apparatus, cause a computerized controller apparatus of a first network to:

cause transmission of data relating to one or more spectrum requests to a spectrum allocation authority;

receive data representative of a response from the spectrum allocation authority, the data representative of the response comprising data relating to at least an allocation of spectrum resources for one or more periods of time;

based at least in part on analysis of at least a portion of the second network, generate data descriptive of at least one optimization policy with respect to at least the allocation of spectrum resources for the one or more periods of time, the data descriptive of the at least one optimization policy configured to cause: (i) selection of at least one quasi-licensed band for use by at least a computerized client device associated with a second network, and (ii) allocation of the selected at least one quasi-licensed band for use by at least the computerized client device;

cause transmission of data to one or more computerized entities of a second network, the transmitted data configured to enable the computerized client device to utilize the selected at least one quasi-licensed band; and establish communication with the computerized client device via use of the at least one quasi-licensed band via one or more access point apparatus of the first network.

19. The computer readable apparatus of claim 18, wherein:

the computerized controller apparatus comprises a multiple systems operator (MSO) CBRS (Citizens Broadband Radio Service) radio access network (RAN) controller serving gateway (SGW); and the second network comprises a network of a mobile network operator (MNO).

20. The computer readable apparatus of claim 18, wherein the data representative of the response from the spectrum allocation authority comprises one or more service class identification values associated with at least the computerized client device.

21. The computer readable apparatus of claim 18, wherein:

the data representative of the response from the spectrum allocation authority comprises data representative of at least one QoS (quality of service) profile associated with at least the computerized client device; and the data representative of the at least one QoS profile is stored at the one or more computerized entities of the second network and made available to the computerized controller apparatus based on the request originating from the at least the computerized client device.

* * * * *